United States Patent
Al-Harthi et al.

(10) Patent No.: US 12,466,924 B2
(45) Date of Patent: *Nov. 11, 2025

(54) COPOLYMERIZATION PROCESS FOR FORMING A POLYETHYLENE COPOLYMER NANOCOMPOSITE

(71) Applicant: KING FAHD UNIVERSITY OF PETROLEUM AND MINERALS, Dhahran (SA)

(72) Inventors: Mamdouh A. Al-Harthi, Dhahran (SA); Muhammad Daud, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 338 days.

This patent is subject to a terminal disclaimer.

(21) Appl. No.: 18/349,447

(22) Filed: Jul. 10, 2023

(65) Prior Publication Data

US 2023/0357517 A1      Nov. 9, 2023

Related U.S. Application Data

(63) Continuation of application No. 16/190,211, filed on Nov. 14, 2018, now Pat. No. 11,753,509.

(60) Provisional application No. 62/643,529, filed on Mar. 15, 2018.

(51) Int. Cl.
*C08J 5/00* (2006.01)

(52) U.S. Cl.
CPC ........... *C08J 5/005* (2013.01); *C08J 2323/06* (2013.01)

(58) Field of Classification Search
CPC ..... C08J 5/005; C08J 2323/06; C08J 2323/08
USPC ....................................... 523/202
See application file for complete search history.

(56) References Cited

U.S. PATENT DOCUMENTS

| | | | |
|---|---|---|---|
| 10,150,850 B2 | 12/2018 | Al-Harthi | |
| 11,753,509 B2 * | 9/2023 | Al-Harthi | ............... C08J 5/005 523/202 |
| 2009/0239067 A1 | 9/2009 | Verlaan et al. | |
| 2016/0122497 A1 | 5/2016 | Al-Harth i | |
| 2017/0137596 A1 | 5/2017 | Al-Harthi et al. | |
| 2017/0306064 A1 | 10/2017 | O'Hare et al. | |

FOREIGN PATENT DOCUMENTS

CN      104927088      9/2015

OTHER PUBLICATIONS

F. Fim, et al., "Polyethylene/graphite nanocomposites obtained by in situ polymerization" Journal of Polymer Science Part A: Polymer Chemistry, vol. 48, Feb. 1, 2010, pp. 692-698 (Abstract Only).
S. Tripathi, et al., "Polyolefin/graphene nanocomposites: a review" RSC Advances, vol. 7, Apr. 28, 2017, pp. 23615-23632.
D. Feldman, "Polyolefin, olefin copolymers and polyolefin polyblend nanocomposites" Journal of Macromolecular Science, Part A, vol. 53, Issue 10, Sep. 3, 2016, 2016 pp. 651-658.
Y. Gao, et al., "Synthesis of Highly Efficient Flame Retardant High-Density Polyethylene Nanocomposites with Inorgano-Layered Double Hydroxides As Nanofiller Using Solvent Mixing Method" ACS Appied Materials & Interfaces, vol. 6, Issue 7, Mar. 19, 2014, pp. 5094-5104.
Cao et al., "Graphene/layered double hydroxide nanocomposite: Properties, synthesis, and applications," Chemical Engineering Journal, Feb. 16, 2016. (Year: 2016).

* cited by examiner

*Primary Examiner* — Hannah J Pak
(74) *Attorney, Agent, or Firm* — Oblon, McClelland, Maier & Neustadt, L.L.P.

(57) ABSTRACT

A method for producing a polyethylene nanocomposite by polymerizing ethylene in a polymerization mixture that contains a graphene-layered double hydroxide nanocomposite, a metallocene catalyst, an alkylaluminoxane co-catalyst, and an organic solvent to form a polyethylene nanocomposite in which the graphene-layered double hydroxide nanocomposite is dispersed in a matrix of polyethylene and wherein the graphene-layered double hydroxide nanocomposite contains 1 to 7 wt. % graphene relative to a total weight of the graphene-layered double hydroxide nanocomposite.

19 Claims, 7 Drawing Sheets

COPOLYMERIZATION PROCESS FOR FORMING A POLYETHYLENE COPOLYMER NANOCOMPOSITE

CROSS REFERENCE TO RELATED APPLICATIONS

The present application is a Continuation of U.S. application Ser. No. 16/190,211, now allowed, having a filing date of Nov. 14, 2018, which claims benefit of priority to U.S. Provisional Application No. 62/643,529, having a filing date of Mar. 15, 2018 which is incorporated herein by reference in its entirety.

BACKGROUND OF THE INVENTION

Technical Field

The present invention relates to methods for forming polyolefin nanocomposite materials from graphene-layered double hydroxide nanocomposite fillers.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recently, polymer nanocomposites have gained great interest due to their potential applications in energy storage applications [V. K. Thakur, M. R. Kessler, Polymer Nanocomposites: New Advanced Dielectric Materials for Energy Storage Applications, in: Adv. Energy Mater., Wiley Blackwell, 2014: pp. 207-257; X. Huang, P. Jiang, Core-shell structured high-k polymer nanocomposites for energy storage and dielectric applications, Adv. Mater. 27 (2015) 546-554], supercapacitors [Z. Zhang, M. Liao, H.-Y. Zeng, S. Xu, X. Liu, J. Du, et al., Temperature effect on chromium (VI) removal by Mg/Al mixed metal oxides as adsorbents, Appl. Clay Sci. 102 (2014) 246-253. doi:10.1016/j.clay.2014.10.005; W. Wu, Y. Li, L. Yang, Y. Ma, D. Pan, Y. Li, A facile one-pot preparation of dialdehyde starch reduced graphene oxide/polyaniline composite for supercapacitors, Electrochim. Acta. 139 (2014) 117-126; F. Chen, P. Liu, Q. Zhao, Well-defined graphene/polyaniline flake composites for high performance supercapacitors, Electrochim. Acta. 76 (2012) 62-68], sensors [L. Al-Mashat, K. Shin, K. Kalantar-Zadeh, J. D. Plessis, S. H. Han, R. W. Kojima, et al., Graphene/polyaniline nanocomposite for hydrogen sensing, J. Phys. Chem. C. 114 (2010) 16168-16173; S. Konwer, A. K. Guha, S. K. Dolui, Graphene oxide-filled conducting polyaniline composites as methanol-sensing materials, J. Mater. Sci. 48 (2013) 1729-1739; S. K. Kumar, M. Castro, A. Saiter, L. Delbreilh, J. F. Feller, S. Thomas, et al., Development of poly(isobutylene-co-isoprene)/reduced graphene oxide nanocomposites for barrier, dielectric and sensingapplications, Mater. Lett. 96 (2013) 109-112], drug delivery [M. Zhang, Y. Li, Z. Su, G. Wei, Recent advances in the synthesis and applications of graphene-polymer nanocomposites, Polym. Chem. 6 (2015) 6107-6124. doi:10.1039/C5PY00777A; T. Kavitha, I. K. Kang, S. Y. Park, Poly(N-vinyl caprolactam) grown on nanographene oxide as an effective nanocargo for drug delivery, Colloids Surfaces B Biointerfaces. 115 (2014) 37-45], water purification [C. A. Crock, A. R. Rogensues, W. Shan, V. V. Tarabara, Polymer nanocomposites with graphene-based hierarchical fillers as materials for multifunctional water treatment membranes, Water Res. 47 (2013) 3984-3996; R. Li, L. Liu, F. Yang, Preparation of polyaniline/reduced graphene oxide nanocomposite and its application in adsorption of aqueous Hg(II), Chem. Eng. J. 229 (2013) 460-468] and food packaging [A. M. Youssef, Polymer Nanocomposites as a New Trend for Packaging Applications, Polym. Plast. Technol. Eng. 52 (2013) 635-660]. Nanofillers (NFs) which are efficiently dispersed in and interact with the polymer matrix provide the polymer with high mechanical strength, thermal stability and enhanced electrical properties, depending on the nature of the nanofiller [JR. Potts, D. R. Dreyer, C. W. Bielawski, R. S. Ruoff, Graphene-based polymer nanocomposites, Polymer (Guildf). 52 (2011) 5-25; F. Shehzad, M. Daud, M. A. Al-Harthi, Synthesis, characterization and crystallization kinetics of nanocomposites prepared by in situ polymerization of ethylene and graphene, J. Therm. Anal. Calorim. 123 (2016) 1501-1511. doi:10.1007/s10973-015-5087-x]. Carbon based NFs, especially carbon nanotubes (CNTs) and graphene, are known fillers for preparing polymer nanocomposites [G. Mittal, V. Dhand, K. Y. Rhee, S.-J. Park, W. R. Lee, A review on carbon nanotubes and graphene as fillers in reinforced polymer nanocomposites, J. Ind. Eng. Chem. 21 (2015) 11-25. doi:10.1016/j.jiec.2014.03.022; H. Kim, A. A. Abdala, C. W. MacOsko, Graphene/polymer nanocomposites, Macromolecules. 43 (2010) 6515-6530]. However, the high production cost and low dispersive index of CNTs have limited their practical use. On the contrary, graphene has a two dimensional (2D) monolayer carbon assembly, arranged in a honeycomb structure with a high surface area [H. Kim, A. A. Abdala, C. W. MacOsko, Graphene/polymer nanocomposites, Macromolecules. 43 (2010) 6515-6530]. Thermal and mechanical properties of the polymers are dramatically enhanced even with low graphene contents [F. Shehzad, S. P. Thomas, M. A. Al-Harthi, Non-isothermal crystallization kinetics of high density polyethylene/graphene nanocomposites prepared by in-situ polymerization, Thermochim. Acta. 589 (2014) 226-234. doi:10.1016/j.tca.2014.05.039]. However, pristine graphene is not generally compatible with organic polymers and requires functionalization or hybridization with the other 2D nanomaterials [M. Zhang, Y. Li, Z. Su, G. Wei, Recent advances in the synthesis and applications of graphene-polymer nanocomposites, Polym. Chem. 6 (2015) 6107-6124. doi:10.1039/C5PY00777A; H. Kim, S. Kobayashi, M. A. Abdurrahim, M. J. Zhang, A. Khusainova, M. A. Hillmyer, et al., Graphene/polyethylene nanocomposites: Effect of polyethylene functionalization and blending methods, Polymer (Guildf). 52 (2011) 1837-1846].

Layered double hydroxides (LDHs) have a highly tunable 2D brucite-like lamellar crystal structure [Q. Wang, D. Ohare, Recent advances in the synthesis and application of layered double hydroxide (LDH) nanosheets, Chem. Rev. 112 (2012) 4124-4155. doi:10.1021/cr200434v]. Like graphene, LDHs are also employed as NFs for the synthesis of polymer nanocomposites [F. R. Costa, M. Saphiannikova, U. Wagenknecht, G. Heinrich, Layered double hydroxide based polymer nanocomposites, Wax Cryst. Control Nanocomposites, Stimuli-Responsive Polym. 210 (2008) 101-168. doi: 10.1007/12_2007_123] and have shown promising thermal stability and flame retardancy [C. a. W. and D. O. Yanshan Gao, Jingwen Wu, QiangWang, Flame retardant polymer/ layered double hydroxide nanocomposites, J. Mater. Chem. A. (2014) 10996-11016. doi:10.1039/c4ta01030b; Z. Matusinovic, C. a. Wilkie, Fire retardancy and morphology of layered double hydroxide nanocomposites: a review, J. Mater. Chem. 22 (2012) 18701]. However, in order to uniformly disperse LDHs into the polymer matrices so as to attain their full benefits, the LDHs typically must be anionically modified or hybridized with others 1D or 2D NFs [B. Pradhan, S. K. Srivastava, A. K. Bhowmick, A. Saxena, Effect of bilayered stearate ion-modified Mg—Al layered double hydroxide on the thermal and mechanical properties of silicone rubber nanocomposites, Polym. Int. 61 (2012) 458-465. doi:10.1002/pi.3218; S. Mallakpour, M. Dinari, Hybrids of Mg—Al-layered double hydroxide and multi-walled carbon nanotube as a reinforcing filler in the 1-phenylalanine-based polymer nanocomposites, J. Therm. Anal. Calorim. 119 (2015) 1905-1912. doi:10.1007/s10973-014-4270-9].

Hybrid nanomaterials fabricated using LDHs and graphene (G/LDHs) possess interesting properties owing to the special properties of the parent materials [Y. Cao, G. Li, X. Li, Graphene/layered double hydroxide nanocomposite: Properties, synthesis, and applications, Chem. Eng. J. 292 (2016) 207-223. doi:10.1016/j.cej.2016.01.114; M.-Q. Zhao, Q. Zhang, J.-Q. Huang, F. Wei, Hierarchical Nanocomposites Derived from Nanocarbons and Layered Double Hydroxides—Properties, Synthesis, and Applications, Adv. Funct. Mater. 22 (2012) 675-694. doi:10.1002/adfm.201102222]. G/LDHs can be used in a variety of applications due to their versatile properties and because these properties can be fine-tuned based on how they are made [M. Daud, M. S. Kamal, F. Shehzad, M. A. Al-Harthi, Graphene/layered double hydroxides nanocomposites: A review of recent progress in synthesis and applications, Carbon N. Y. 104 (2016) 241-252. doi:10.1016/j.carbon.2016.03.057]. Hybrid nanomaterials have great potential to be used as supercapacitors [Y. Zhong, Y. Liao, A. Gao, J. Hao, D. Shu, Y. Huang, et al., Supercapacitive behavior of electrostatic self-assembly reduced graphene oxide/CoAl-layered double hydroxides nanocomposites, J. Alloys Compd. 669 (2016) 146-155], medical applications [S. Fu, G. Fan, L. Yang, F. Li, Non-enzymatic glucose sensor based on Au nanoparticles decorated ternary Ni—Al layered double hydroxide/single-walled carbon nanotubes/graphene nanocomposite, Electrochim. Acta. 152 (2015) 146-154] and hybrid sensors [H. Li, J. Wen, R. Yu, J. Meng, C. Wang, C. Wang, et al., Facile synthesis of a nanocomposite based on graphene and ZnAl layered double hydroxides as a portable shelf of a luminescent sensor for DNA detection, Rsc Adv. 5 (2015) 9341-9347] etc. In addition, polymer nanocomposites developed using hybrid NFs such as graphene/aluminum oxide hydroxide have shown significant improvement in mechanical, thermal and electrical properties [B. Yuan, C. Bao, X. Qian, S. Jiang, P. Wen, W. Xing, et al., Synergetic dispersion effect of graphene nanohybrid on the thermal stability and mechanical properties of ethylene vinyl acetate copolymer nanocomposite, Ind. Eng. Chem. Res. 53 (2014) 1143-1149].

High density polyethylene (HDPE) and linear low density polyethylene (LLDPE), synthesized by the copolymerization of ethylene with co-monomers [M. Daud, F. Shehzad, M. A. Al-Harthi, Crystallization behaviour and lamellar thickness distribution of metallocene-catalyzed polymer: Effect of 1-alkene comonomer and branch length, Can. J. Chem. Eng. (2016). doi:10.1002/cjce.22711], are the two most common and widely used resins of polyethylene (PE) due to their low production cost and advantageous properties [P. S. Chum, K. W. Swogger, Olefin polymer technologies-History and recent progress at The Dow Chemical Company, Prog. Polym. Sci. 33 (2008) 797-819. doi:10.1016/j.progpolymsci.2008.05.003]. These polymers are used extensively in food 10 packaging (e.g., plastic bags), pipes, etc. [S. T. Harini, S. Padmavathi, A. Satish, B. Raj, Food compatibility and degradation properties of pro-oxidant-loaded LLDPE film, J. Appl. Polym. Sci. 131 (2014) n/a-n/a. doi:10.1002/app.39756].

In view of the foregoing, one objective is to provide methods for the production of polyolefin nanocomposites that are both efficient, and that produce polyolefin nanocomposites having properties that differ from the pure polyolefin for use in various applications.

BRIEF SUMMARY OF THE INVENTION

Accordingly, it is one object of the present invention to provide efficient methods for producing polyethylene nanocomposites by polymerizing ethylene in the presence of a graphene-layered double hydroxide nanocomposite.

These and other objects, which will become apparent during the following detailed description, have been achieved by the inventors' discovery that higher catalysts activities are realized when a graphene-layered double hydroxide nanocomposite is included in the polymerization mixture, and that higher molecular weight homopolymers or co-polymers having a higher percent incorporation of co-monomers are obtained using the methods herein compared to methods devoid of the graphene-layered double hydroxide nanocomposite.

According to a first aspect, the present disclosure relates to a method for producing a polyethylene nanocomposite that includes polymerizing ethylene in a polymerization mixture containing a graphene-layered double hydroxide nanocomposite, a metallocene catalyst, an alkylaluminoxane co-catalyst, and an organic solvent to form the polyethylene nanocomposite, wherein the polyethylene nanocomposite comprises the graphene-layered double hydroxide nanocomposite dispersed in a matrix of polyethylene.

In some embodiments, the graphene-layered double hydroxide nanocomposite includes a layered double hydroxide and 1 to 7 wt. % graphene relative to a total weight of the graphene-layered double hydroxide nanocomposite.

In some embodiments, the layered double hydroxide is a Mg(II)/Al(III) layered double hydroxide.

In some embodiments, the Mg(II)/Al(III) layered double hydroxide has a molar ratio of Mg(II) to Al(III) of 2:1 to 4:1.

In some embodiments, the layered double hydroxide has a lamellar morphology of adhered hexagonal nanoplatelets having a particle size of 40 to 100 nm.

In some embodiments, the graphene is in the form of nanosheets having a largest dimension of 50 to 100 nm.

In some embodiments, the graphene is dispersed in, and bound to, the layered double hydroxide.

In some embodiments, the graphene-layered double hydroxide nanocomposite has a BET surface area of 50 to 75 $g/m^2$.

In some embodiments, the metallocene catalyst is zirconocene dichloride.

In some embodiments, the alkylaluminoxane co-catalyst is methylaluminoxane.

In some embodiments, the organic solvent is an aromatic hydrocarbon.

In some embodiments, a weight ratio of the alkylaluminoxane co-catalyst to the metallocene catalyst is 30:1 to 70:1.

In some embodiments, a weight ratio of the graphene-layered double hydroxide nanocomposite to the metallocene catalyst is from 10:1 to 13:1.

In some embodiments, the polyethylene nanocomposite comprises 0.05 to 3 wt. % of the graphene-layered double hydroxide nanocomposite relative to a total weight of the polyethylene nanocomposite.

In some embodiments, the polyethylene nanocomposite is a high density polyethylene nanocomposite comprising the graphene-layered double hydroxide nanocomposite dispersed in a matrix of high density polyethylene.

In some embodiments, the high density polyethylene has a weight average molecular weight of 94,000 to 100,000 g/mol and a polydispersity index of 3.2 to 3.5.

In some embodiments, 210 to 250 kg of high density polyethylene is produced per mole of the metallocene catalyst per hour per bar (kgPE·mol$^{-1}$·hr$^{-1}$·bar$^{-1}$).

In some embodiments, the polymerization mixture further comprises at least one co-monomer of 1-butene, 1-hexene, and 1-octene, and wherein the polyethylene nanocomposite is a linear low density polyethylene nanocomposite comprising the graphene-layered double hydroxide nanocomposite dispersed in a matrix of linear low density polyethylene.

In some embodiments, the linear low density polyethylene is a copolymer of ethylene and the at least one co-monomer, and wherein a % incorporation of the at least one co-monomer into the linear low density polyethylene is 5.2 to 10 mol %, based on a total number of moles of ethylene and the at least one co-monomer incorporated into the linear low density polyethylene.

In some embodiments, the linear low density polyethylene has a weight average molecular weight of 15,000 to 25,000 g/mol and a polydispersity index of 1.5 to 2.7, and wherein the linear low density polyethylene nanocomposite has a peak crystallization temperature ($T_{peak}$) of 65 to 73° C.

In some embodiments, 320 to 450 kg of linear low density polyethylene is produced per mole of the metallocene catalyst per hour per bar (kgPE·mol$^{-1}$·hr$^{-1}$·bar$^{-1}$).

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
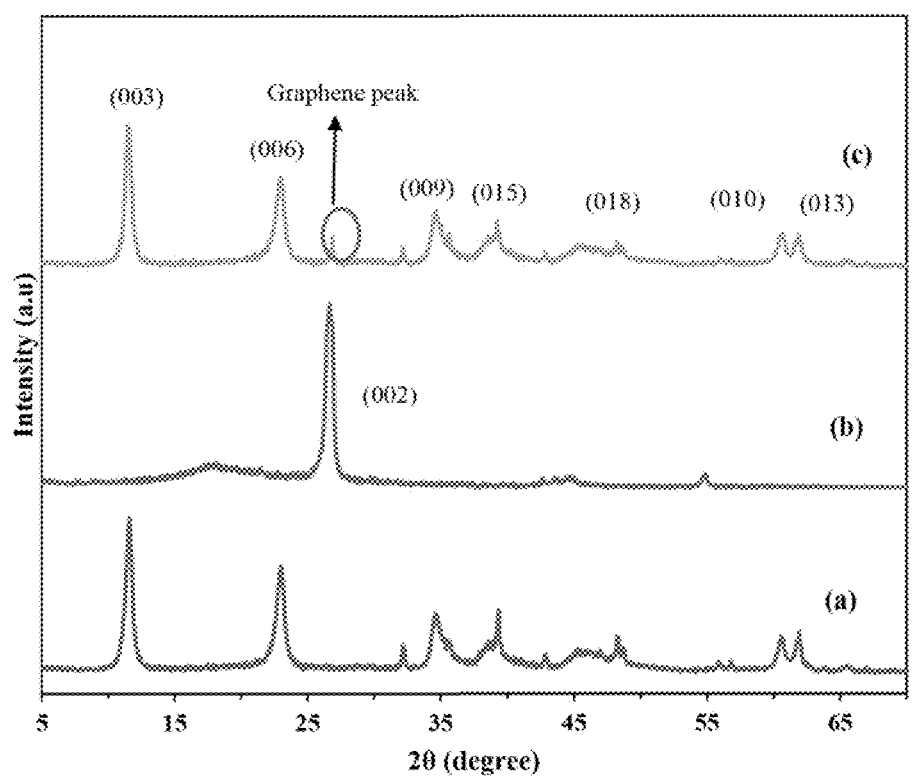
FIG. 1. shows XRD patterns of (a) MgAl LDHs; (b) pristine graphene (PG) and (c) 100LDHs.

Embodiments of the present disclosure will now be described more fully hereinafter with reference to the accompanying drawings, in which some, but not all embodiments of the disclosure are shown.

As used herein, the words "a" and "an" and the like carry the meaning of "one or more". Additionally, within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g. 0 wt. %).

The phrase "substantially free", unless otherwise specified, describes an amount of a particular component (e.g., non-composited graphene), that when present, is present in an amount of less than about 1 wt. %, preferably less than about 0.5 wt. %, more preferably less than about 0.1 wt. %, even more preferably less than about 0.05 wt. %, relative to a total weight of the composition being discussed, and also includes situations where the composition is completely free of the particular component (i.e., 0% wt.).

The term "comprising" is considered an open-ended term synonymous with terms such as including, containing or having and is used herein to describe aspects of the invention which may include additional components, functionality and/or structure. Terms such as "consisting essentially of" are used to identify aspects of the invention which exclude particular components that are not explicitly recited in the claim but would otherwise have a material effect on the basic and novel properties of the polyolefin nanocomposite or the methods for making said material. The term "consisting of" describes aspects of the invention in which only those features explicitly recited in the claims are included and thus other components not explicitly or inherently included in the claim are excluded.

A weight percent of a component, unless specifically stated to the contrary, is based on the total weight of the formulation or composition in which the component is included. For example if a particular element or component in a composition is said to have 8 wt. %, it is understood that this percentage is in relation to a total compositional percentage of 100%, unless stated otherwise.

As used herein, the term "substituted" refers to at least one hydrogen atom that is replaced with a non-hydrogen group, provided that normal valencies are maintained and that the substitution results in a stable compound. When a compound or a R group (denoted as $R_1$, $R_2$, and so forth) is noted as "optionally substituted", the substituents are selected from the exemplary group including, but not limited to, alkyl (e.g., methyl, ethyl, propyl, isopropyl, butyl, isobutyl, t-butyl, pentyl, isopentyl, neopentyl, hexyl, isohexyl, 3-methylpentyl, 2,2-dimethylbutyl, 2,3-dimethylbutyl), cycloalkyl (e.g., cyclopropyl, cyclobutyl, cyclopentyl, cyclohexyl, norbornyl, and adamantyl), cycloalkylalkyl (e.g., cyclohexylmethyl), arylalkyl (e.g., benzyl, 2-phenethyl, 2-methylbenzyl, 3-methylbenzyl), heteroaryl (pyridyl, pyrimidinyl, pyrazinyl, pyridazinyl, triazinyl, furyl, quinolyl, isoquinolyl, thienyl, imidazolyl, thiazolyl, indolyl, pyrroyl), aryl (e.g., phenyl, biphenyl, naphthyl, anthracenyl), alkoxy (e.g., methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy and decyloxy), cycloalkyloxy (e.g., cyclopentyloxy, cyclohexyloxy, and cycloheptyloxy), aryloxy (e.g., phenoxy, p-tolyloxy), arylalkyloxy (e.g., benzyloxy, 2-phenethoxy), aroyl (e.g., benzoyl and naphthoyl), alkanoyl (e.g., acetyl, propionyl, butyryl, isobutyryl, pivaloyl, valeryl, hexanoyl, octanoyl, lauroyl, and stearoyl), alkanoyloxy (e.g., acetyloxy, propionyloxy, butyryloxy, isobutyryloxy, pivaloyloxy, valeryloxy, hexanoyloxy, octanoyloxy, lauroyloxy, and stearoyloxy), carboxy, alkoxycarbonyl (e.g., methyl ester, ethyl ester, and pivaloyl ester), hydroxyl, halo (e.g. chlorine, bromine, fluorine or iodine), amino (e.g. alkylamino, arylamino, arylalkylamino, alkanoylamino, either mono- or disubstituted), nitro, cyano, alkylsulfonyl (i.e. —$SO_2$alkyl), arylsulfonyl (i.e. —$SO_2$aryl), arylalkylsulfonyl (i.e. —$SO_2$arylalkyl), sulfonamido (e.g. —$SO_2NH_2$, —$SO_2$NHalkyl, —$SO_2$NHaryl, —$SO_2$NHarylalkyl or cases with two substituents on one nitrogen atom), haloalkyl, amido (e.g. —$CONH_2$, —CONHalkyl, —CONHaryl, —CONHarylalkyl or cases where there are two substituents on one nitrogen), and mixtures thereof and the like. The substituents may themselves be optionally substituted, and may be either unprotected, or protected as necessary, as known to those skilled in the art, for example, as taught in Greene, et al., "Protective Groups in Organic Synthesis", John Wiley and Sons, Second Edition, 1991, hereby incorporated by reference in its entirety).

A "nanocomposite" is a multiphase solid material where at least one of the phases has one, two or three dimensions of less than 100 nanometers, or structures having nano-scale repeat distances between the different phases that make up the material. In the broadest sense this definition can include porous media, colloids, gels and copolymers, but is more usually taken to mean the solid combination of a bulk matrix and a nano-dimensional phase differing in properties due to dissimilarities in structure and chemistry. In general, the mechanical, electrical, thermal, optical, electrochemical, catalytic properties of the nanocomposite will differ from that of the individual component materials.

The present invention relates to a method for producing a polyolefin nanocomposite, such as a polyethylene nanocomposite, by polymerizing an olefin monomer (e.g., ethylene) in a polymerization mixture that includes a graphene-layered double hydroxide nanocomposite, a metallocene catalyst, an alkylaluminoxane co-catalyst, and an organic solvent. The polyolefin nanocomposite thus produced contains a graphene-layered double hydroxide nanocomposite dispersed in a matrix of polyolefin, for example polyethylene.

Graphene-Layered Double Hydroxide Nanocomposite

Fillers are particles added to materials, such as plastics, to engender superior properties of the mixed material. Further, fillers may affect the process by which a material or mixed material is processed, making production more efficient, more facile, higher yielding etc. Fillers, and in particular nanofillers (i.e., added materials with at least one dimension of less than 100 nm) change the properties of the material to which they are added, and/or affect the process by which the mixed material is produced or manufactured. In the methods described herein, a nanofiller is preferably included as a component of a polymerization mixture during a polymerization reaction and thus the nanofiller component is homogeneously dispersed in the polymer matrix as the polymer chain grows. Because the compositing between the nanofiller and the polymer occurs while the polymer chain is being formed, such a method is referred to as "in-situ polymerization". As will become clear, the presence the nanofiller during polymerization impacts the production rate of the polymer as well as the structure and properties of the polymer/nanofiller nanocomposite produced. In preferred embodiments, enough nanofiller is employed in the polymerization method so as to produce a polyolefin nanocomposite having 0.05 to 3 wt. %, preferably 0.1 to 3 wt. %, preferably 0.2 to 3 wt. %, preferably 0.4 to 2.5 wt. %, preferably 0.6 to 2 wt. %, preferably 0.8 to 1.8 wt. %, preferably 1 to 1.6 wt. % of the nanofiller (e.g., graphene-layered double hydroxide nanocomposite) relative to a total weight of the polyolefin nanocomposite.

In some embodiments, the nanofiller employed is a graphene-layered double hydroxide nanocomposite (i.e., a composite material formed from a layered double hydroxide phase and a graphene phase).

Layered double hydroxides (LDH) are a class of ionic solids characterized by a layered structure with the generic layer sequence $[AcBZAcB]_n$, where c represents layers of metal cations, A and B are layers of hydroxide ($HO^-$) anions, and Z are layers of other anions and neutral molecules (such as water). Lateral offsets between the layers may result in longer repeating periods. LDHs can be seen as derived from hydroxides of divalent cations with the brucite layer structure $[AdBAdB]_n$, by oxidation or cation replacement in the metal layers (d), so as to give them an excess positive electric charge; and intercalation of extra anion layers (Z) between the hydroxide layers (A,B) to neutralize that charge, resulting in the structure $[AcBZAcB]_n$. LDHs may be formed with a wide variety of anions in the intercalated layers (Z), such as $Cl^-$, $Br^-$, $NO_3^-$, $CO_3^{2-}$, $SO_4^{2-}$ and $SeO_4^{2-}$.

An LDH may be synthetic or a naturally-occurring layered double hydroxide. Naturally-occurring layered double hydroxides include those in the Hydrotalcite Group (hydrotalcite, pyroaurite, stichtite, meixnerite, iowaite, droninoite, woodallite, desautelsite, takovite, reevesite, orjamborite), the Quintinite Group (quintinite, charmarite, caresite, zaccagnaite, chlormagaluminite, or comblainite), the Fougerite group (fougerite, trebeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered double hydroxide, such as coalingite, brugnatellite, or muskoxite.

In preferred embodiments, the layered double hydroxide has a positive layer (c) which contains both divalent and trivalent cations, which may be represented by formula (1)

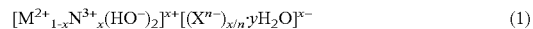

$$[M^{2+}_{1-x}N^{3+}_x(HO^-)_2]^{x+}[(X^{n-})_{x/n} \cdot yH_2O]^{x-} \qquad (1)$$

where:

$X^{n-}$ is the intercalating anion (or anions), preferably $NO_3^-$;

$M^{2+}$ is $Ca^{2+}$, $Mg^{2+}$, $Mn^{2+}$, $Fe^{2+}$, $Co^{2+}$, $Ni^{2+}$, $Cu^{2+}$, and/or $Zn^{2+}$, preferably $Mg^{2+}$;

$N^{3+}$ is $Al^{3+}$, $Mn^{3+}$, $Cr^{3+}$, $Sc^{3+}$, $Ga^{3+}$, $La^{3+}$, $V^{3+}$, $Sb^{3+}$, $Y^{3+}$, $In^{3+}$, $Co^{3+}$ and/or $Ni^{3+}$, preferably $Al^{3+}$;

x is from 0.2 to 0.33, preferably from 0.21 to 0.30, preferably from 0.22 to 0.28, preferably from 0.23 to 0.27, preferably from 0.24 to 0.26, preferably about 0.25; and y is from 0.5 to 4, preferably 1 to 3, preferably about 2.

In preferred embodiments, the layered double hydroxide is a Mg(II)/Al(III) layered double hydroxide, where some $Mg^{2+}$ in a brucite-like structure (crystalline $Mg(OH)_2$) is substituted by $Al^{3+}$. Preferably a molar ratio of Mg(II) to Al(III) in the Mg(II)/Al(III) layered double hydroxide is from 2:1 to 4:1, preferably 2.4:1 to 3.8:1, preferably 2.8:1 to 3.2:1, preferably 2.9:1 to 3.1:1, preferably about 3:1.

The layered double hydroxide phase of the graphene-layered double hydroxide nanocomposite may be of any shape that provides desired polymerization activity and properties to the final polymer/nanofiller nanocomposite. Preferably, the layered double hydroxide component may have a particulate form, for example in the form of spheres, granules, whiskers, sheets, flakes, plates, foils, fibers, and the like. The layered double hydroxide particles may have a particle size of 40 to 100 nm, preferably 45 to 90 nm, preferably 50 to 80 nm, preferably 55 to 75 nm, preferably 60 to 70 nm. In preferred embodiments, the layered double hydroxide particles are in the form of plates, or nanoplatelets due to their small size. The nanoplatelets may be substantially round or oval shaped nanoplatelets or, alternatively, the nanoplatelets may be polygonal nanoplatelets, such as triangular, square, rectangular, pentagonal, hexagonal, star-shaped, and the like. Preferably, the layered double hydroxide particles are in the form of hexagonal nanoplatelets with particle sizes stated above. Such nanoplatelets may have a thickness of less than 10 nm, preferably less than 8 nm, preferably less than 6 nm, preferably less than 4 nm.

The individual layered double hydroxide particles (microstructure) may also agglomerate or otherwise adhere to one another, and thus share an interconnected outer boundary, to form a distinct agglomerated macrostructure. In preferred embodiments, the layered double hydroxide particles are in the form of nanoplatelets which are stacked or which overlap thereby forming a lamellar or scale-like morphology. Preferably, the layered double hydroxide phase of the graphene-layered double hydroxide nanocomposite is composed of an arrangement of stacked/overlapping hexagonal nanoplatelets which are agglomerated/adhered to one another to form a lamellar or scale-like morphology. Without being bound by theory, this lamellar or scale-like morphology may advantageously prevent agglomeration of the graphene phase and may enhance the catalyst activity.

In some embodiments, the graphene-layered double hydroxide nanocomposite contains 90 to 99.5 wt. %, 93 to 99 wt. %, preferably 94 to 98 wt. %, preferably 95 to 97 wt. %, preferably about 96 wt. % of the layered double hydroxide, relative to a total weight of the graphene-layered double hydroxide nanocomposite.

In preferred embodiments, besides the layered double hydroxide phase in the graphene-layered double hydroxide nanocomposite, no other hydroxide material is present in the polymerization mixture, either as a stand-alone material or as a composite for example with graphene. Exemplary hydroxide materials which are preferably excluded from the methods herein include boehmite, diaspore, akdalaite, gibbsite, bayerite, doyleite, nordstrandite, brucite, portlandite, goethite, kaolinite, as well as composites that include these hydroxide materials.

The graphene-layered double hydroxide nanocomposite also contains a graphene phase, for example 0.5 to 10 wt. %, preferably 1 to 7 wt. %, preferably 2 to 6 wt. %, preferably 3 to 5 wt. %, preferably about 4 wt. % graphene relative to a total weight of the graphene-layered double hydroxide nanocomposite. Graphene is an allotrope of carbon in the form of a two-dimensional, atomic-scale hexagonal lattice in which one atom forms each vertex and is the basic structural element of other allotropes including graphite, charcoal, carbon nanotubes and fullerenes. Structurally, graphene is a sheet of six membered carbon rings that do not form a closed surface. Its carbon atoms are densely packed in a regular atomic-scale "chicken wire" (hexagonal) pattern. Each atom has four bonds, one σ-bond with each of its three neighbors and one π-bond that is oriented out of the plane. Graphene's hexagonal lattice can be regarded as two interleaving triangular lattices. Graphene's stability is due to its tightly packed carbon atoms and each carbon atom in a graphene sheet having a $sp^2$ orbital hybridization and delocalized electrons present at opposite surfaces of the graphene sheet. The $sp^2$ hybridization is a combination of orbitals S, $P_x$ and $P_y$ that constitute the σ-bond, the final $P_z$ electron makes up the π-bond. The π-bonds hybridize together to form the π-band and the π-band. These bands are responsible for most of graphene's notable electronic properties, via the half-filled band that permits free-moving electrons. Graphene is a zero-gap semiconductor. Graphene is also a form of carbon (or solid material) in which every atom is available for chemical reaction from two sides (due to the 2D structure).

The graphene phase of the graphene-layered double hydroxide nanocomposite may be present in the form of sheets, platelets, particles, or any other structure, preferably in the form of sheets. The graphene sheets of the present disclosure may be one-atom thick (~0.33 nm) single layers, or monolayer, or alternatively may contain two, three, four, or more stacked graphene layers. Thus, in some embodiments the graphene sheets may have a thickness greater than one atom and up to 200 atoms, preferably up to 100 atoms, preferably up to 50 atoms, preferably up to 30 atoms, preferably up to 20 atoms, preferably up to 10 atoms, preferably up to 5 atoms, preferably up to 4 atoms, preferably up to 3 atoms. In some embodiments, the graphene is in the form of sheets having a largest dimension of less than 3 μm, preferably less than 2 μm, preferably less than 1 μm, preferably less than 500 nm, preferably less than 300 nm, preferably less than 200 nm, preferably less than 100 nm, preferably the graphene is in the form of nanosheets having a largest dimension of 50 to 100 nm, preferably 60 to 90 nm, preferably 70 to 80 nm.

The graphene sheets may have wrinkled, rippled, or corrugated morphologies, with a height of these wrinkles, ripples, or corrugations measured from the basal plane of the graphene sheets ranging from 0.25 nm to about 5 nm, preferably from 0.3-2.5 nm, preferably from 0.5-2 nm, preferably from 1-1.5 nm. Alternatively, the graphene sheets may have a flat, smooth surface, with a substantially decreased surface area relative to wrinkled, rippled, or corrugated sheets of comparable size. In preferred embodiments, the graphene is in the form of flat, smooth graphene sheets. In some embodiments, graphene is composited with the layered doubly hydroxide so that the produced graphene-layered double hydroxide nanocomposite has a BET surface area of 50 to 75 $g/m^2$, preferably 55 to 70 $g/m^2$, preferably 60 to 65 $g/m^2$, preferably about 63 $g/m^2$.

In preferred embodiments, the graphene component of the graphene-layered double hydroxide nanocomposite is pristine graphene, meaning it has not been chemically modified so as to possess functional groups (e.g., hydroxyl groups, carboxyl groups, etc.), and is a pure carbonaceous material having a purity of greater than 90%, preferably greater than 95%, preferably greater than 96%, preferably greater than 97%, preferably greater than 98%, preferably greater than 99%. Graphene material is preferably employed which has a C/O ratio of at least 10, preferably at least 20, preferably at least 30, preferably at least 40, preferably at least 50, preferably at least 75, preferably at least 100, preferably at least 150, preferably at least 200, and most preferably is substantially free of oxygen. Pristine graphene is thus chemically distinct from graphene oxide at least in terms of oxygen content (e.g., C/O ratio of 2.1 to 2.9), as well as reduced graphene oxide which contains defects/aromatic network interruptions not present in pristine graphene. However, in some embodiments, functionalized graphene may be employed, for example graphene which has been subjected to a strong oxidant (e.g., nitric acid, inorganic or organic peroxides, metal perchlorates or permanganates such as potassium permanganate, etc.) so as to possess oxidized functional groups such as hydroxyl groups, carboxyl groups, epoxy groups, and a C/O ratio of less than 4, preferably less than 3, preferably 2 to 2.9. In some embodiments, the graphene phase of the graphene-layered double hydroxide nanocomposite is reduced graphene oxide.

The graphene phase described above may be dispersed in, and bound to, the layered double hydroxide, for example through electrostatic (e.g., cation-pi, van der Waals interactions, etc.) or mechanical forces to form the graphene-layered double hydroxide nanocomposite used in the polymerization reaction. In preferred embodiments, the polymerization mixture is substantially free of, and more preferably completely free of, free graphene (i.e., graphene which is not composited with the LDH material). In other words, all graphene material is preferably added to the polymerization mixture as a composite with the LDH, that is, graphene and LDH are composited separately, then the pre-formed graphene-layered double hydroxide nanocomposite is added to the polymerization mixture. This is because free graphene, when used as a filler in in-situ ethylene polymerization reactions, is known to reduce the activity of the catalyst despite the higher surface area of free graphene [F. Shehzad, M. Daud, M. A. Al-Harthi, Synthesis, characterization and crystallization kinetics of nanocomposites prepared by in situ polymerization of ethylene and graphene, J. Therm. Anal. Calorim. (2016), 123, 2, 1501-1511. doi:10.1007/s10973-015-5087-x—incorporated herein by reference in its entirety].

Similarly, there is preferably no free (i.e., non-composited) LDH present in the polymerization mixture during the in-situ polymerization reaction.

The graphene-layered double hydroxide nanocomposite can be prepared by any method known to those of ordinary skill in the art, preferably by a co-precipitation method. Briefly, the co-precipitation method may involve ultrasonicating or otherwise agitating graphene in a 0.05 to 1 M hydroxide solution (e.g., sodium hydroxide), preferably 0.1 to 0.5 M, preferably 0.15 to 0.4 M, preferably 0.2 to 0.3 M, for up to 4 hours, preferably up to 2 hours, preferably up to 1 hour, preferably up to 30 minutes. The ultrasonicated/agitated graphene may then be mixed with a precursor salt solution containing a mixture of Mg(II) and Al(III) salts to obtain a hybrid solution. The molar ratio of Mg(II) to Al(III) in the precursor salt solution is preferably from 2:1 to 4:1, preferably 2.4:1 to 3.8:1, preferably 2.8:1 to 3.2:1, preferably 2.9:1 to 3.1:1, preferably about 3:1. The precursor salts may be $Cl^-$, $Br^-$, $NO_3^-$, $CO_3^{2-}$, $SO_4^{2-}$ or $SeO_4^{2-}$ salts of each of magnesium and aluminum, most preferably the precursor salts are $Mg(NO_3)_2$ and $Al(NO_3)_3$. The resulting hybrid solution may then be stirred, and the pH is preferably adjusted to 8 to 12, preferably 9 to 11, preferably about 10 with additional hydroxide solution (e.g., 0.5 to 1.5 M, preferably about 1M sodium hydroxide), and subsequently refluxed at 95 to 100° C. for 12 to 48 hours, preferably 24 to 30 hours thus forming a black dense suspension. The black dense suspension may be separated to collect the black solid, for example through centrifugation, and the black solid may then be optionally washed with water, and oven dried to provide the graphene-layered double hydroxide nanocomposite.

Metallocene Catalyst

The polymerization mixture also includes a metallocene catalyst. As used herein, a catalyst is a substance that can cause a change in the rate of a chemical reaction without itself being consumed in the reaction. The metallocene catalyst may be a Ziegler-Natta polymerization catalyst useful for catalyzing olefin polymerization reactions from olefin monomers such as ethylene, propylene, n-butylene, 1-hexene, 1-octene as well as higher homologs and other olefin-containing compounds such as 1,3-butadiene. While any known heterogeneous Ziegler-Natta catalysts may be used, in preferred embodiments, the Zeigler-Natta catalyst is a homogeneous catalyst, for example, a metallocene catalyst based on complexes of Ti, Zr or Hf, and which may be employed in combination with an organoaluminum co-catalyst (e.g., methylaluminoxane, MAO). The combination of metallocene catalyst and organoaluminum co-catalysts renders these catalyst mixtures soluble in a wide array of common organic solvents, hence their classification as homogeneous catalysts.

Metallocenes are a type of sandwich compound, an organometallic complex featuring a metal bound by haptic covalent bonds to two arene ligands. A metallocene is a compound typically containing two substituted or unsubstituted cyclopentadienyl anions (cp, which is $C_5H_5^-$) bound to a metal center (M) in the oxidation state II or IV, with the resulting general formula $(C_5H_5)_2M$ or $(C_5H_5)_2MX_2$, e.g., titanocene dichloride, vanadocene dichloride. When the metal of the metallocene is zirconium, the complex is then referred to as zirconocene. Further, the metallocene catalyst may be a parallel, a multi-decker, a bridged (e.g. ansa-bridged), a half-sandwich, or a bent complex. The metallocene catalyst of the present method may also include more than two cp groups.

In preferred embodiments, the metallocene catalyst employed in the ethylene polymerization reaction is a zirconocene catalyst of the general formula 2

$$(cp)_2 ZrR^1 R^2 \qquad (2)$$

wherein cp represents an optionally substituted cyclopentadienyl group, and $R^1$ and $R^2$ are each independently an optionally substituted alkyl group, a cyclopentadienyl group, a halogen atom (e.g., Cl, Br, I, etc.), or a hydrogen atom. Exemplary cp groups include, but are not limited to, cyclopentadienyl, pentamethylcyclopentadienyl, and 1,2-diphenyl cyclopentadienyl. Preferably, cp is an unsubstituted cyclopentadienyl group and $R^1$ and $R^2$ are halogen atoms, most preferably chlorides. In preferred embodiments, the metallocene catalyst is zirconocene dichloride.

The catalyst loading with respect to the olefin starting material may be generally varied, however, a weight ratio of the graphene-layered double hydroxide nanocomposite to the metallocene catalyst will typically range from 8:1 to 15:1, preferably 9:1 to 14:1, preferably 10:1 to 13:1, preferably 11:1 to 12.5:1.

While most Ziegler-Natta catalysts contain a metallocene complex, it is envisaged that the present method may be adapted for use with a non-metallocene polymerization catalyst. Such catalysts may be comprised of a variety of complexes of various metals, such as chromium (e.g., Philips-type catalysts), scandium, lanthanoid, and actinoid metals, and a wide variety of ligands containing oxygen, nitrogen, phosphorous, and sulfur. For example, such catalysts may feature multidentate oxygen- and nitrogen-based ligands, known by those of ordinary skill in the art. Any metal and ligand combination may be used as the catalyst in the present method, so long as it provides the desired catalytic activity and resulting nanocomposite properties.

Alkylaluminoxane Co-Catalyst

The metallocene catalyst in a Ziegler-Natta polymerization reaction such as zirconocene dichloride may be accurately referred to as a pre-catalyst, since the dichloride structure is not responsible for the catalytic polymerization. Instead, the zirconocene dichloride converts to the active catalyst in-situ after reaction with a co-catalyst. A co-catalyst is a chemical species that acts upon a catalyst for reaction to occur, or that improves the catalytic activity of a catalyst by acting as a promoter in a cooperative catalytic process. In the Ziegler-Natta reaction, the co-catalyst may be an organoaluminum compound which performs a ligand exchange reaction with the metallocene catalyst, ultimately forming a cationic metal species that catalyzes the olefin polymerization reaction. In the present method, the organoaluminum co-catalyst may be an alkylaluminoxane co-catalyst. In preferred embodiments, a weight ratio of the alkylaluminoxane co-catalyst to the metallocene catalyst is 30:1 to 70:1, preferably 35:1 to 65:1, preferably 40:1 to 60:1, preferably 45:1 to 55:1, preferably 50:1 to 53:1, preferably about 52:1. In preferred embodiments, a weight ratio of the alkylaluminoxane co-catalyst to the graphene-layered double hydroxide nanocomposite is 1:1 to 10:1, preferably 2:1 to 8:1, preferably 3:1 to 6:1, preferably 4:1 to 5:1. The alkylaluminoxane co-catalyst is preferably added to the polymerization mixture as a solution in organic solvent (e.g., in toluene), most preferably, the alkylaluminoxane co-catalyst is the last component added to the polymerization reaction.

Alkylaluminoxanes are compounds prepared from the partial hydrolysis of alkylaluminum species, for example, $C_1$-$C_{12}$ trialkylaluminum species, or $C_2$-$C_{10}$ trialkylaluminum species, or $C_3$-$C_8$ trialkylaluminum species, such as trimethylaluminum, triethylaluminum, triisopropylaluminum, tri-n-propylaluminum, triisobutylaluminum, tri-n-pentylaluminum, trioctylaluminum, and the like. In some embodiments, the alkylaluminoxane co-catalyst employed herein is a $C_1$-$C_{12}$ alkyl aluminoxane, a $C_2$-$C_{10}$ alkyl aluminoxane, or a $C_3$-$C_8$ alkyl aluminoxane, examples of which include, but are not limited to, methylaluminoxane (MAO), ethylaluminoxane, isopropylaluminoxane, n-propylaluminoxane, isobutylaluminoxane, and n-pentylaluminoxane. Preferably, methylaluminoxane is employed as the alkylaluminoxane co-catalayst.

Other organoaluminum co-catalysts may be utilized in addition to, or in lieu of, the alkylaluminoxane co-catalysts above, examples of which include the $C_1$-$C_{12}$ trialkylaluminum compounds described above (e.g., trimethylaluminum, triethylaluminum, triisopropylaluminum, tri-n-propylaluminum, triisobutylaluminum, tri-n-pentylaluminum, trioctylaluminum), $C_1$-$C_{12}$ dialkylaluminum monohalides (e.g., diethylaluminum monochloride, diethylaluminum monobromide, diethylaluminum monoiodide, diisopropylaluminum monochlonde, diisobutylaluminum monochloride, and dioctylaluminum monochloride), $C_1$-$C_{12}$ alkylaluminum sesquihalides (e.g., methylaluminum sesquichloride, ethylaluminum sesquichloride, ethylaluminum sesquibromide, and butylaluminum sesquichloride), as well as mixtures thereof.

Organic solvent The polymerization reaction may be carried out in a polymerization mixture that includes an organic solvent. However, the organic solvent is optional when the starting olefin monomer is a liquid under standard pressures, for example, butylene, 1-hexene, etc. When employed, the organic solvent may be used for dilution purposes, to control the polymerization reaction rate, to modulate the reaction temperature, to aid transfer of one or more reaction components, or to aid product purification after polymerization is completed.

The organic solvent is preferably a non-polar solvent. In some embodiments, the organic solvent is an aromatic solvent, most preferably an aromatic hydrocarbon. Exemplary aromatic solvents include, but are not limited to, benzene, ethylbenzene, o-xylene, m-xylene, p-xylene, and mixtures of xylenes, toluene, mesitylene, anisole, 1,2-dimethoxybenzene, $\alpha,\alpha,\alpha$,-trifluoromethylbenzene, and fluorobenzene. In some embodiments, the organic solvent is an alkane solvent. Exemplary alkane solvents include, but are not limited to, pentane, cyclopentane, hexanes, cyclohexane, heptanes, cycloheptane, and octanes. In preferred embodiments, the organic solvent is toluene. Other organic solvents that me be used, particularly as co-solvents, include ethers (e.g. diethyl ether, tetrahydrofuran, 1,4-dioxane, tetrahydropyran, t-butyl methyl ether, cyclopentyl methyl ether, diisopropyl ether), glycol ethers (e.g. 1,2-dimethoxyethane, diglyme, triglyme), chlorinated solvents (e.g. chlorobenzene, dichloromethane, 1,2-dichloroethane, 1,1-dichloroethane, chloroform, carbon tetrachloride), ester solvents (e.g. ethyl acetate, propyl acetate), ketones (e.g. acetone, butanone). Mixtures of any of the above organic solvents may also be utilized.

The amount of organic solvent employed may be varied, but typically the organic solvent may be added so that the catalyst has a concentration in the organic solvent of 0.01 to 10 mM, preferably 0.05 to 5 mM, preferably 0.1 to 0.5 mM, preferably 0.15 to 0.4 mM, preferably 0.2 to 0.3 mM. In some embodiments, enough organic solvent is added to the polymerization mixture so that the weight of the graphene-layered double hydroxide nanocomposite (mg) to volume of solvent (mL) is 0.25 to 2 mg/mL, preferably 0.5 to 1 mg/mL, preferably 0.75 to 1.5 mg/mL.

Olefin Monomer

An olefin monomer capable of undergoing polymerization is also added to the polymerization mixture. Preferably, the olefin monomer contains at least one $\alpha$-olefin group, but may contain more than one in the case of diene or polyene monomers. The olefin monomer may be a single monomer if a homopolymer nanocomposite is desired or a mixture of monomers if a copolymer nanocomposite is desired. Olefin monomers suitable for polymerization reactions are known to those of ordinary skill, and may include olefin monomers having 2 to 12 carbons, preferably 3 to 10 carbons, preferably 4 to 8 carbons, preferably 5 to 6 carbons, examples of which include ethylene, propylene, n-butylene, isobutene, 1,3-butadiene, 1-pentene, 1-hexene, hexadiene, 1-octene, 1-decene, isoprene, styrene, 4-methylpent-1-ene, and the like. In preferred embodiments, at least ethylene is present as the olefin monomer in the polymerization mixture. In some embodiments, the polymerization mixture contains ethylene and no other olefin monomers. In alternative embodiments, the polymerization mixture contains a mixture of monomers, for example, ethylene and 1-hexene.

The olefin monomer may be introduced into the polymerization mixture in a gaseous state, or in a liquid state depending on the particular olefin monomer. When the olefin monomer to be added is in a gaseous state (e.g., as is the case with ethylene), it may be introduced into the polymerization mixture under positive pressure, for example from 1.02 to 10 bar, preferably 1.05 to 5 bar, preferably 1.1 to 3 bar, preferably 1.15 to 2 bar, preferably 1.2 to 1.8 bar, preferably 1.25 to 1.6 bar, preferably 1.3 to 1.5 bar. In some embodiments, the polymerization mixture may be fully saturated or partially saturated with gaseous olefin monomer. Preferably, the olefin monomer is added to the polymerization mixture until saturation. Most preferably, the method involves polymerization of at least ethylene, and the polymerization mixture is fully saturated with ethylene gas. When the olefin monomer is a liquid under standard temperature and pressure (e.g., as is the case with 1-hexene), it may be added to the polymerization mixture at any point during the polymerization process, including batch-wise or drop-wise. Preferably any liquid olefin monomers are added prior to the introduction of the alkylaluminoxane co-catalyst.

The quantity of the olefin monomer(s) added into the polymerization mixture may be controlled and adjusted in order to control the molecular weight and branching of the polyolefin produced. Further, in cases where a co-polymer is desired, the percent incorporation of the co-monomers may be controlled by adjusting the amount of the respective olefin monomers present in the polymerization mixture. In some embodiments, a molar ratio of a first olefin monomer (e.g., ethylene) to a second olefin monomer (e.g., 1-hexene) is from 85:15 to 99.5:0.5, preferably 90:10 to 99:1, preferably 92:8 to 98:2, preferably 94:6 to 97:3, preferably 95:5 to 96:4.

Polymerization Reaction

In some embodiments, a reactor is charged with the metallocene catalyst, the graphene-layered double hydroxide nanocomposite, and the organic solvent, and optionally any desired liquid olefin monomers. The reactor may be optionally placed under an inert atmosphere, for example, under a nitrogen or argon atmosphere.

When adding gaseous olefin monomer(s) (e.g., ethylene), the reactor may be connected by to a feed source of the olefin monomer(s) by a feed line to deliver the gaseous olefin monomer under positive pressure as described above. In some embodiments, the olefin monomer(s) may be introduced into the reactor under positive pressure for up to 20 minutes, up to 15 minutes, up to 10 minutes, up to 5 minutes so as to saturate with the olefin monomer(s).

The polymerization reaction may be performed at room temperature or at elevated temperature, for example, the polymerization mixture may be optionally heated up to 100° C., preferably up to 80° C., preferably up to 60° C., preferably up to 40° C., preferably up to 30° C.

In some embodiments, the alkylaluminoxane co-catalyst is added to the polymerization mixture after all olefin monomer(s) have been introduced. Alternatively, the alkylaluminoxane co-catalyst may be added to a polymerization mixture containing the metallocene catalyst, the graphene-layered double hydroxide nanocomposite, the organic solvent, and the bulk olefin monomer to commence polymerization, and additional olefin monomer (e.g., the at least one co-monomer, additional bulk olefin monomer) may be added during the course of the polymerization reaction to control the percent incorporation of co-monomer, the linearity of the polymer being produced, the molecular weight of the polymer being produced etc., as desired. Of course, the order of addition of the various components stated above is but one example, and various adjustments and modifications may be made as appropriate.

In some embodiments, the olefin monomer(s) is polymerized for up to 12 hours, preferably up to 10 hours, preferably up to 5 hours, preferably up to 2 hours, preferably up to 1 hour, preferably up to 30 minutes before quenching with an acid and/or an alcoholic solvent, for example, acidic methanol. The polyolefin nanocomposite (e.g., polyethylene nanocomposite) thus produced may be separated and purified according to methods known by those of ordinary skill, for example, the polyolefin nanocomposite may collected by filtration or centrifugation, and dried.

The method may be referred to as an "in-situ polymerization" method because the graphene-layered double hydroxide nanocomposite is present during the formation of the polyolefin. In this method, the olefin monomer(s) and/or catalyst may be adsorbed in the gaps of the graphene-layered double hydroxide nanocomposite where polymerization occurs. For example, the metallocene catalyst may enter the gaps in the nanofiller (e.g., the graphene-layered double hydroxide nanocomposite), resulting in increased gap sizes, which then enables the olefin monomer (e.g., ethylene) to diffuse freely into the gaps to contact the metal center of the metallocene catalyst. In some embodiments, the olefin monomer may enter the gaps in the nanofiller, resulting in increased gap sizes, which then enables the metallocene catalyst to diffuse freely into the gaps to contact olefin monomers for the polymerization reaction. Further, localized heat may be generated during the polymerization which may aid the homogeneous dispersion of the graphene-layered double hydroxide nanocomposite in the polyolefin matrix. As a result, the graphene-layered double hydroxide nanocomposite is evenly distributed in the polymer matrix as the polyolefin chain grows, resulting in a polyolefin nanocomposite where the graphene-layered double hydroxide nanocomposite is homogeneously dispersed in the polyolefin matrix.

In some embodiments, neither of the metallocene catalyst or the alkylaluminoxane co-catalyst is pre-reacted or pre-supported onto the graphene-layered double hydroxide nanocomposite. Rather, the un-treated graphene-layered double hydroxide nanocomposite is added to the polymerization reaction as a separate reaction component. This is because, even though the method may involve adding together the metallocene catalyst and the graphene-layered double hydroxide nanocomposite prior to reaction initiation, pre-reacting or pre-supporting the metallocene catalyst onto the graphene-layered double hydroxide nanocomposite may not leave enough open sites for the olefin monomer for chain elongation. Therefore, in preferred embodiments, the metallocene catalyst, the alkylaluminoxane co-catalyst, and the graphene-layered double hydroxide nanocomposite are all added as separate components, and any reaction or depositing between these components takes place in situ during the polymerization process.

In the polyolefin nanocomposite thus produced, the graphene-layered double hydroxide nanocomposite may interact with the polyolefin (e.g., polyethylene) via electrostatic (e.g., van der Waals), mechanical forces, or both. In some embodiments, the graphene-layered double hydroxide nanocomposite interacts with the polyolefin through van der Waals forces, for example, through interactions with the C—C backbone of the polyolefin. In some embodiments, the graphene-layered double hydroxide nanocomposite may be physically dispersed (i.e., no chemical reactions) within the polyolefin matrix. Preferably, the graphene-layered double hydroxide nanocomposite is homogeneously dispersed within the polymer matrix and may disrupt intermolecular interactions between polymer chains.

In preferred embodiments, the method herein involves the polymerization of ethylene, or where a majority of olefin monomers present in the polymerization mixture are ethylene monomers, to form a nanocomposite in which the graphene-layered double hydroxide nanocomposite is dispersed in a matrix of polyethylene (PE). Polyethylene (PE) is the most common type of plastic and is primarily used in packaging (plastic bag, plastic films, geomembranes, containers including bottles, etc.). Many kinds of polyethylene are known, having the chemical formula $(C_2H_4)_nH_2$. Thus PE is usually a mixture of similar organic compounds that differ in terms of the value of n and the extent of branching.

Polyethylene is classified into several different categories based mostly on its density and branching. Its mechanical properties depend significantly on variables such as the extent and type of branching, the crystal structure and the molecular weight. In the present invention, exemplary PE classes include, ultra-high-molecular-weight polyethylene (UHMWPE), ultra-low-molecular-weight polyethylene (ULMWPE or PE-WAX), high-molecular-weight polyethylene (HMWPE), high-density polyethylene (HDPE), medium-density polyethylene (MDPE), linear low-density polyethylene (LLDPE), low-density polyethylene (LDPE), and very-low-density polyethylene (VLDPE).

In some embodiments, the method forms a high density polyethylene nanocomposite of the graphene-layered double hydroxide nanocomposite dispersed in a matrix of high density polyethylene (HDPE). In some embodiments, the high density polyethylene is a homopolymer formed from only ethylene and no other olefin monomer is present during the polymerizing. In some embodiments, in addition to ethylene as the major olefin monomer, the polymerization mixture further comprises at least one co-monomer, for example, 1-butene, 1-hexene, and 1-octene, preferably 1-hexene. When at least one co-monomer is present, the molar ratio of ethylene to the at least one co-monomer in the polymerization mixture is preferably at least 98:2, preferably at least 99:1, more preferably at least 99.5:0.5. In some embodiments, the HDPE formed has about 2 to 10, preferably 3 to 9, preferably 4 to 8, preferably 5 to 7 branches per 1000 carbon atoms. In some embodiments, the HDPE formed has a density of 0.941 to 0.965 g/cm$^3$, preferably 0.945 to 0.960 g/cm$^3$, preferably 0.95 to 0.955 g/cm$^3$, preferably about 0.953 g/cm$^3$.

The presence of the graphene-layered double hydroxide nanocomposite in the polymerization mixture may stabilize the metallocene catalyst leading to higher molecular weight polymers compared to cases where no nanofiller is employed or where the nanofiller is a non-composited layered double hydroxide. In some embodiments, the methods herein produce HDPE having a weight average molecular weight of up to 3,000,000 g/mol, preferably up to 2,000,000 g/mol, preferably up to 1,000,000 g/mol, preferably up to 500,000 g/mol, preferably up to 400,000 g/mol, preferably up to 300,000 g/mol, preferably up to 200,000 g/mol, preferably up to 100,000 g/mol. In preferred embodiments, the HDPE has a weight average molecular weight of 94,000 to 100,000 g/mol, preferably 94,100 to 98,000 g/mol, preferably 94,200 to 96,000 g/mol, as determined by GPC analysis. In some embodiments, the methods herein form high density polyethylene polymers having a polydispersity index ($M_w/M_n$) of 3.2 to 3.5, preferably 3.3 to 3.4.

The presence of the graphene-layered double hydroxide nanocomposite in the polymerization mixture may also increase the activity of the metallocene catalyst, resulting in a more efficient process even at lower catalyst loadings, when compared to cases where no nanofiller is employed or where the nanofiller is a non-composited layered double hydroxide. In preferred embodiments, the methods described herein produce 210 to 250 kg of high density polyethylene per mole of the metallocene catalyst per hour per bar (kgPE·mol$^{-1}$·hr$^{-1}$·bar$^{-1}$), preferably 215 to 245 kgPE·mol$^{-1}$·hr$^{-1}$·bar$^{-1}$, preferably 220 to 240 kgPE·mol$^{-1}$·hr$^{-1}$·bar$^{-1}$, preferably 225 to 235 kgPE·mol$^{-1}$·hr$^{-1}$·bar$^{-1}$, preferably 230 to 233 kgPE·mol$^{-1}$·hr$^{-1}$·bar$^{-1}$, as determined by yield analysis. The graphene-layered double hydroxide nanocomposite in the polymerization mixture may increase the catalyst activity by 40 to 50%, preferably 42 to 49%, preferably 44 to 48%, preferably about 47.6%, relative to methods performed without the graphene-layered double hydroxide nanocomposite but are otherwise substantially the same.

The high density polyethylene nanocomposite produced by the methods herein may be used as a replacement for HDPE, for example in the manufacture of, or applications relating to, food packaging (e.g., plastic bags, plastic bottles, milk jugs, detergent bottles, butter tubs), garbage containers, water pipes, corrosion-resistant piping, geomembranes, plastic lumber, energy storage applications, supercapacitors, sensors, drug delivery, water purification, toys, among many other uses.

In some embodiments, in addition to ethylene as the major olefin monomer, the polymerization mixture further comprises at least one co-monomer, for example, 1-butene, 1-hexene, and 1-octene, preferably 1-hexene, and the method forms a linear low density polyethylene nanocomposite comprising the graphene-layered double hydroxide nanocomposite dispersed in a matrix of linear low density polyethylene. Linear low density polyethylene (LLDPE) has a significant number of short branches, making its chains able slide against each other upon elongation without becoming entangled. In some embodiments, the LLDPE formed has a density of 0.91 to 0.94 g/cm$^3$, preferably 0.92 to 0.93 g/cm$^3$.

In some embodiments, a mixture of ethylene and 1-hexene is polymerized, and no other olefin monomers are present in the polymerization mixture. The molar ratio of ethylene to 1-hexene in the polymerization mixture may range from 85:15 to 97:3, preferably 90:10 to 97:3, preferably 92:8 to 96:4, preferably 94:6 to 96:4, preferably about 95:5. The presence of the graphene-layered double hydroxide nanocomposite in the polymerization mixture may cause a higher % incorporation of the co-monomer (e.g., 1-hexene) into the polymer chain and thus produce LLDPE polymers having more short chain branching and thus decreased weight average molecular weights compared to cases where no nanofiller is employed or where the nanofiller is a non-composited layered double hydroxide. In some embodiments, a % incorporation of the at least one co-monomer (e.g., 1-hexene) into the linear low density polyethylene is from 5.2 to 10 mol %, preferably 5.3 to 9 mol %, preferably 5.4 to 8 mol %, preferably 5.5 to 7 mol %, preferably 5.6 to 6 mol %, preferably 5.7 to 5.9 mol %, preferably about 5.8 mol %, based on a total number of moles of ethylene and the at least one co-monomer incorporated into the linear low density polyethylene, as determined by $^{13}$C NMR analysis.

In some embodiments, the methods herein produce LLDPE having a weight average molecular weight of 15,000 to 25,000 g/mol, preferably 17,000 to 23,000 g/mol, preferably 19,000 to 21,000 g/mol, and a polydispersity index of 1.5 to 2.7, preferably 1.7 to 2.6, preferably 1.9 to 2.5, preferably 2.1 to 2.4, as determined by GPC analysis. The increase in short chain branches, that is, the increased incorporation of the co-monomer (e.g., 1-hexene) into the LLDPE polymer, can also be seen from the decrease in peak crystallization temperature ($T_{peak}$), compared to methods where no nanofiller is employed or where the nanofiller is a non-composited layered double hydroxide. In some embodiments, the linear low density polyethylene nanocomposite has a peak crystallization temperature ($T_{peak}$) of 65 to 73° C., preferably 66 to 72.5° C., preferably 67 to 72° C., preferably 68 to 71.5° C., preferably 69 to 71.1° C., as determined by crystallization analysis fractionation.

The presence of the graphene-layered double hydroxide nanocomposite in the polymerization mixture may also increase the activity of the metallocene catalyst, resulting in a more efficient process even at lower catalyst loadings, when compared to cases where no nanofiller is employed or where the nanofiller is a non-composited layered double hydroxide.

In preferred embodiments, the methods described herein produce 320 to 450 kg of linear low density polyethylene per mole of the metallocene catalyst per hour per bar (kgPE·mol$^{-1}$·hr$^{-1}$·bar$^{-1}$), preferably 340 to 440 kgPE·mol$^{-1}$·hr$^{-1}$·bar$^{-1}$, preferably 360 to 430 kgPE·mol$^{-1}$·hr$^{-1}$·bar$^{-1}$, preferably 380 to 420 kgPE·mol$^{-1}$·hr$^{-1}$·bar$^{-1}$, preferably 385 to 410 kgPE·mol$^{-1}$·hr$^{-1}$·bar$^{-1}$, as determined by yield analysis. The graphene-layered double hydroxide nanocomposite in the polymerization mixture may increase the catalyst activity by 50 to 70%, preferably 54 to 65%, preferably 56 to 60%, preferably about 58.5%, relative to methods performed without the graphene-layered double hydroxide nanocomposite but are otherwise substantially the same.

The linear low density polyethylene nanocomposite produced by the methods herein may be used as a replacement for LLDPE, for example in the manufacture of, or applications relating to, plastic bags and sheets, plastic wrap, stretch wrap, pouches, toys, covers, lids, pipes, buckets and containers, cable and other electronic coverings, geomembranes, and flexible tubing, among many other uses.

Optional Ingredients

In preferred embodiments, the polyolefin nanocomposite consists of the graphene-layered double hydroxide nanocomposite and the polyolefin (e.g., polyethylene). In some embodiments, the polyolefin nanocomposite consists essentially of the graphene-layered double hydroxide nanocomposite and the polyolefin (e.g., polyethylene), with insignificant amounts of the metallocene catalysts or byproducts thereof also being present, but which do not materially affect the composition or properties of the polyolefin nanocomposite. In some embodiments, the graphene-layered double hydroxide nanocomposite is the only inorganic material present. However, in some embodiments, other ingredients may optionally be included in the polymerization mixture to disperse those ingredients within the produced polyolefin nanocomposite. Alternatively, the optional ingredients may be added, mixed, blended, or otherwise incorporated into the polyolefin nanocomposite post in-situ polymerization. Such optional ingredients include, but are not limited to, fillers (other than the graphene-layered double hydroxide nanocomposite), plasticizers, process aids, solid foaming agents, accelerators, modifiers, processing oils, pigments and dyes, as well mixtures thereof. When present, these optional ingredients may be included in the polyolefin nanocomposite in amounts up to 10 wt. %, preferably up to 5 wt. %, preferably up to 3 wt. %, preferably up to 1 wt. %, preferably up to 0.5 wt. %, relative to the total weight of the polyolefin nanocomposite.

Non-limiting examples of fillers (other than the graphene-layered double hydroxide nanocomposite) that can be included in the polyolefin nanocomposite material herein include, but are not limited to, natural fibers (e.g., cellulose, lignocellulose, lignin); glass fibers (e.g., milled glass fiber); keratin feather fiber; metallic fibers (e.g., carbon fibers, silicon fibers); inorganic oxides (e.g. aluminum oxide, zirconia, titania, iron oxide, magnesium oxide, calcium oxide, silica, quartz, silica-alumina); inorganic hydroxides (e.g., hydrotalcite); metal carbides (e.g., silicon carbide, chromium carbide, titanium carbide, zirconium carbide, boron carbide, tungsten carbide); metal nitrides (e.g., silicon nitride, antimony nitride (SbN, SbN$_3$, Si$_3$N$_4$), boron nitride, zirconium nitride, niobium nitride, titanium nitride); metal borides (e.g., titanium boride, zirconium boride, tantalum boride, vanadium boride, lanthanum boride); metal silicides (e.g., titanium silicide, tantalum silicide, molybdenum silicide, tungsten silicide; inorganic salts (e.g. calcium carbonate, silicon carbonate potassium carbonate, sodium carbonate, barium carbonate); silicates such as those based on the oxides of lithium, calcium, barium, strontium, magnesium, aluminum, sodium, potassium, cerium, tin, strontium, boron, lead, and mixtures thereof (e.g. talc, kaolin, montmorillonite, mica); metals (e.g., silver, aluminum, nickel, zinc, molybdenum, iron, and tin); carbonaceous materials (e.g., graphene oxide, carbon nanotubes, carbon nanorods, graphene, reduced graphene oxide, graphite/graphite powder, carbon powder, carbon black such as furnace black and Ketjenblack® from AkzoNobel, activated carbon, including modified carbonaceous materials such as L-aspartic acid functionalized carbonaceous materials); silica (e.g. silicalites, zeolites, fumed silica powder); asphalt, asphaltenes, and asphalt powder.

Non-limiting examples of plasticizers include, but are not limited to, phthalates, trimellitates, adipates, sebacates, maleates, benzoates, terephthalates, sulfonamides, organophospahtes, and polyethers. Specific examples include, but are not limited to, bis(2-ethylhexyl) phthalate (DEHP), diisononyl phthalate (DINP), di-n-butyl phthalate (DnBP, DBP), butyl benzyl phthalate (BBzP), diisodecyl phthalate (DIDP), dioctyl phthalate, o-nitrophenyloctylether, trimethyl trimellitate (TMTM), tri-(2-ethylhexyl) trimellitate (TEHTM-MG), tri-(n-octyl,n-decyl) trimellitate (ATM), tri-(heptyl,nonyl) trimellitate (LTM), n-octyl trimellitate (OTM), bis(2-ethylhexyl)adipate (DEHA), dimethyl adipate (DMAD), monomethyl adipate (MMAD), dioctyl adipate (DOA), dibutyl sebacate (DBS), dibutyl maleate (DBM), diisobutyl maleate (DIBM), dioctyl terephthalate, 1,2-cyclohexane dicarboxylic acid diisononyl ester, alkyl sulphonic acid phenyl ester (ASE), N-ethyl toluene sulfonamide (o/p ETSA), N-(2-hydroxypropyl) benzene sulfonamide (HP BSA), N-(n-butyl) benzene sulfonamide (BBSA-NBBS), tricresyl phosphate (TCP), tributyl phosphate (TBP), and triethylene glycol dihexanoate. Any other plasticizers known by those of ordinary skill in the art may also be used.

Polymer processing aids may be those fluoropolymers generally recognized in the melt processing field as being capable of improving melt processability of polymers. The fluoropolymers may be thermoplastic or elastomeric materials. Preferred fluoropolymers include homopolymers or copolymers derived from vinylidene difluoride, hexafluoropropylene, and tetrafluoroethylene monomers. Additionally, other conventional polymer processing additives may be included with the fluoropolymer to impart specific functional features.

Any solid foaming agent may be optionally used as long as they are insoluble in hydrocarbon solvents such as aliphatic hydrocarbons, alicyclic hydrocarbons, and aromatic hydrocarbons. Representative examples of such solid foaming agents include azo compounds such as azodicarbonamide and azobisisobutyronitrile, nitroso compounds such as dinitrosopentamethylenetetramide, and sulfonylhydrazide compounds such as p-toluenesulfonylhydrazide and p,p'-oxybis-(benzenesulfonylhydrazide).

Accelerators may include transition metal salts based on iron, cobalt, manganese, cerium, copper or nickel, as well as photosensitizers like anthraquinone or benzophenone derivatives.

Modifiers may include ionomers, ethylene/butene/1,9-decadiene copolymers, dendritic polyethylene, or any other modifier known by those of ordinary skill in the art, such as those described in U.S. Pat. No. 7,943,700—incorporated herein by reference in its entirety.

Suitable processing oils may include paraffin-type mineral oils, commercially available examples of suitable processing oils include Paralux® processing oil and Hydrobrite® processing oil, respectively commercially available from Chevron and Sonneborn.

Exemplary pigments and dyes may include, but are not limited to, indigo, molecular derivatives of indigo, thioindigos, molecular derivatives of thioindigo, anthraquinones, anthrathrones, anthrapyrimidines, monoazos, diazos, azomethines, quinacridones, quinophthalones, diketopyrrolopyrrols, inanthrones, isoindolines, perylenes, perinones, phthalocyanines, pyranthrones, pyrazolo-quinazolones, diphenylmethanes, acridines, xanthenes, triarylmethanes, thiazines, indophenols, indulines, nigrosines, aminoazobenzenes, anilines, benzimidazoles, benzopyrans, quinolines, aminoketones, alizarins, naphthalimides, acridones, anthracenediones, anthrathioxanthenones, carmine, beta carotene, carmine hydrosoluble, turmeric, beet, annato, metal complex dyes, metal complex pigments, azo/metal complexes, a rutile pigment, a spinel pigment, a bismuth vanadate pigment, a cerium sulfide pigment, and combinations thereof.

Of course, the polyolefin nanocomposites produced by the methods herein may be optionally incorporated into or with other polymer types to form polymer blends using blending processes employed in the art. For example, the methods herein may further involve melt blending the obtained polyolefin nanocomposite (e.g., polyethylene nanocomposite) with other polymer types such as polystyrene (PS) and high impact polystyrene (HIPS), polyvinyl chloride (PVC), polyvinylidene chloride (PVDC), polypropylene (PP), natural rubber (NR), acrylics such as poly(methylmethacrylate) (PMMA), polyamides such as nylon, polylactic acid (PLA), polybenzimidazole (PBI), polycarbonate (PC), polyether sulfone (PES), polyoxymethylene (POM), polyetherether ketone (PEEK), polyetherimide (PEI), polyphenylene oxide or sulfide (PPO or PPS), acrylonitrile butadiene styrene (ABS), polyethylene/acrylonitrile butadiene styrene (PE/ABS), polycarbonate/acrylonitrile butadiene styrene (PC/ABS), polybutene, polymethylpentene, polycycloolefins, polybutadiene, polyisoprene, amorphous poly-alpha-olefins (APAO), polyacetylene, as well as mixtures thereof.

Further, the polyolefin nanocomposite may be additionally altered after formation to instill any desired polymer properties. The additional alterations may comprise any post polymerization technique that modifies polymeric properties, such as vulcanization, grafting, and/or cross-linking. Further polymer processing techniques, such as blow molding, thermoforming, coating, extrusion, injection molding, fiber spinning, filament winding, pultrusion, and the like are considered to be within the scope of the present method.

After the in-situ polymerization, the polyolefin nanocomposite may be manipulated/manufactured to have any desired shape. For example, the polyolefin nanocomposite may be manufactured to be in the form of sheets, particles, granules, extrudates, lumps, spheres, spheroids, cubes, cuboids, rods, fibers, flakes, plates, tubes or other hollow shapes, polygons, pipes, hose, wire, cable or any other desirable shape. For example, the polyethylene nanocomposite may be subject to known plastic processing steps, and thus may be melted, blended, extruded, molded, compressed, casted, cooled, solidified, etc. to have any desirable shape suitable for a particular application.

The present embodiments are being described with reference to specific example embodiments and are included to illustrate but not limit the scope of the disclosure or the claims.

EXAMPLES

Experimental

Chemical Reagents

Bis(cyclopentadienyl zirconium (IV) dichloride) >98% ($C_{10}H_{10}Cl_2Zr$), Methylaluminoxane (MAO), Aluminum(III) nitrate nonahydrate [$Al(NO_3)_3 \cdot 9H_2O$], magnesium(II) nitrate hexahydrate [$Mg(NO_3)_2 \cdot 6H_2O$] and all other chemicals and solvents were provided by Sigma Aldrich Co. Graphene (96-99%, 50-100 nm) was purchased from Grafen Chemical Industries Co. (Turkey).

Preparation of MgAl LDHs

The standard co-precipitation method was adopted for the preparation of pure MgAl LDHs [E. L. Crepaldi, P. C. Pavan, J. B. Valim, Comparative study of the coprecipitation methods for the preparation of Layered Double Hydroxides, J. Braz. Chem. Soc. 11 (2000) 64-70. doi:10.1590/50103-50532000000100012—incorporated herein by reference in its entirety]. Briefly, precursor salts solution of both $Mg(NO_3)_2 \cdot 6H_2O$ (0.03M) and $Al(NO_3)_3 \cdot 9H_2O$ (0.01M) were initially well-mixed in 50 mL of deionized (DI) water. Subsequently, the pH was adjusted at 10±0.1 using 1M NaOH solution under vigorous stirring condition at 60° C. After stabilizing the desired pH, the suspension was kept for reflux for 24 h at 95° C. The resultant white slurry was then centrifuge and washed with DI water and ethanol to remove any impurity. Lastly, the dense suspension was dried in vacuum oven at 60° C. for 24h. Approximately, 2.5 g of pure LDHs was synthesized with 3:1 molar ratio of precursor salts ($Mg^{2+}$: $Al^{3+}$).

Synthesis of Hybrid G/MgAl LDHs

The hybrids of G/MgAl LDHs were synthesized using a co-precipitation method, as described previously [M. Daud, M. S. Kamal, F. Shehzad, M. A. Al-Harthi, Graphene/layered double hydroxides nanocomposites: A review of recent progress in synthesis and applications, Carbon N. Y. 104 (2016) 241-252. doi:10.1016/j.carbon.2016.03.057—incorporated herein by reference in its entirety]. Initially, graphene was ultrasonicated in 50 ml solution of NaOH (0.20M) solution for 30 min. The amount of graphene employed during this study was 100 mg and is abbreviated as 100LDHs. The ultrasonicated graphene was mixed with 3:1 molar precursor salt solution under continuous vigorous stirring. Consequently, the pH of the mixture was maintained at 10±0.1 using 1M NaOH solution. The resultant hybrid solution was then kept for reflux at 95° C. for 24 h with subsequent centrifuging and washing. Finally the black dense suspension was dried in oven and characterized using XRD, FTIR, SEM and TEM. The weight percent of graphene in G/LDHs were calculated to be 4% from yield analysis.

In-Situ Polymerization

In situ polymerization of ethylene-co-1-hexene was carried out in a Schlenk reactor, according to a previously described procedure [M. Daud, F. Shehzad, M. A. Al-Harthi, Non-isothermal crystallization kinetics of LLDPE prepared by in situ polymerization in the presence of nano titania, Polym. Bull. 72 (2015) 1233-1245. doi:10.1007/s00289-015-1335-2—incorporated herein by reference in its entirety]. Briefly, the reactor was initially charged with 6 mg (20 μmol) of zirconocene catalyst, 75 mg of hybrid G/LDHs nanofiller, 1 mL of co-monomer (1-hexene) and 100 mL of solvent (toluene) under nitrogen environment, inside the glove box. The reactor was then connected to ethylene feed line (1.3 bar gauge pressure) and maintained at a temperature of 30° C. using oil bath and hot plate. Subsequently, 5 ml of MAO was introduced to the reactor after 5 min of saturation with ethylene. The reaction was then stopped after 30 min of reaction time and quenched with acidified methanol under vigorous stirring. The polymerization product was then filtered and dried in oven for 24 h at 60° C. After drying, the polymer was weighted to calculate the activity, before subjected to other characterization steps. Three repeated samples were synthesized each time to remove any experimental error.

Characterization Techniques
1. The purity and crystalline phases of the as-synthesized hybrid NFs were investigated using room temperature wide-angle XRD. The sampling were carried out using Mini-Flex XRD (from Rigaku) operated at 40 kV and 15 mA with CuK alpha radiation ($\lambda$=1.54060). The diffraction angle was selected in the range of 5 to 70 degrees (2$\theta$) at a scanning rate of 2 degree per minute.
2. Fourier transform infrared spectra (FT-IR) spectra of the G/LDHs NFs were recorded with a PerkinElmer FT-IR spectrometer (model 16F—PC) using KBr pellet technique in the range of 4000 to 400 cm$^{-1}$.
3. Surface morphology of the as-synthesized NFs was observed using TESCAN Lyra-3 Field Emission Dual Beam (Electron/Focused Ion Beam) system combined with high resolution field emission scanning electron microscope (FE-SEM).
4. The dispersion of graphene and structural analysis of the as-synthesized hybrid NFs were observed with JEOL, JEM-2100F (USA) Transmission electron microscope (TEM).
5. Crystallization analysis fractionation (CRYSTAF) supplied by Polymer Char (model-200) was employed to find the micro-structure and chemical composition distribution (CCD) of the polymer nanocomposites. Initially, the samples were dissolved in 1,2,4-trichlorobenzene (0.1 mg/mL), with subsequent cooling at 0.1° C./min, with built-in infrared sensor detecting the crystallized portion of the polymer.
6. To find the co-monomer incorporation analysis, 13 carbon nuclear magnetic resonance ($^{13}$C NMR) was conducted. ASTM method 5017-96 [ASTM D5017-96 (2009)e1, Standard Test Method for Determination of Linear Low Density Polyethylene (LLDPE) Composition by Carbon-13 Nuclear Magnetic Resonance, ASTM Int. West Conshohocken, PA, 2003. (2009)— incorporated herein by reference in its entirety], based on integration of peaks relative to main methylene resonance at 30.0 ppm on x-axis was employed to compute the effect of nanofiller on the co-monomer incorporation.
7. The molecular weights and molecular weight distribution (MWD) of the polymers were studied by triple detection high temperature gel permeation chromatography (HT-GPC) calibrated with polystyrene standards and using 1,2,4-trichlorobenzene as solvent.

Results and Discussion
Establishment of Hybrid G/LDHs NFs
a. XRD Patterns

XRD patterns of pure MgAl LDHs, pristine graphene (PG) and 100LDHs are depicted in FIG. 1. The PG has shown an intense crystalline characteristic peak around 2$\theta$≈26° which corresponds to C(002) plane obtained from graphene reflection [S. Roy, S. K. Srivastava, J. Pionteck, V. Mittal, Mechanically and Thermally Enhanced Multiwalled Carbon Nanotube-Graphene Hybrid filled Thermoplastic Polyurethane Nanocomposites, Macromol. Mater. Eng. 300 (2015) 346-357. doi:10.1002/mame.201400291]. Moreover, the sharp diffraction peaks inherited by pure LDHs and 100LDHs indicate their good lamellar structure and high crystalline nature. The diffraction peaks are approximately at (2$\theta$≈) 11°, 23°, 35°, 39°, 60° and 62° which relates to the (003), (006), (009), (012), (110) and (113) crystal structure planes respectively, and is in consistent with the reported data [V. Rives, Characterisation of layered double hydroxides and their decomposition products, Mater. Chem. Phys. 75 (2002) 19-25. doi:10.1016/S0254-0584(02)00024-X; S. Roy, S. K. Srivastava, J. Pionteck, V. Mittal, Assembly of layered double hydroxide on multi-walled carbon nanotubes as reinforcing hybrid nanofiller in thermoplastic polyurethane/nitrile butadiene rubber blends, Polym. Int. 65 (2016) 93-101. doi:10.1002/pi.5032 incorporated herein by reference in its entirety]. The pure MgAl LDHs had more intense peaks at (003) and (006) planes compared to 100LDHs due to the high crystalline structure of pure MgAl LDHs. Moreover, the graphene presence in the sample originates (002) peak (See FIG. 1, c) in 100LDHs. In addition, the width of the XRD spectral peaks increases with the addition of graphene compared to pure LDHs [M. G. Alvarez, D. Tichit, F. Medina, J. Llorca, Role of the synthesis route on the properties of hybrid LDH-graphene as basic catalysts, Appl. Surf. Sci. (2016). doi:10.1016/j.apsusc.2016.11.037 incorporated herein by reference in its entirety]. Notably, the consistent appearance of (110) and (113) planes of almost same intensity in both bare LDHs and G/LDHS have confirmed the well maintain lamellar crystal structure of LDHs [R. Ma, X. Liu, J. Liang, Y. Bando, T. Sasaki, Molecular-Scale Heteroassembly of Redoxable Hydroxide Nanosheets and Conductive Graphene into Superlattice Composites for High-Performance Supercapacitors, Adv. Mater. 26 (2014) 4173-4178. doi:10.1002/adma.201400054; W. Ma, R. Ma, C. Wang, J. Liang, X. Liu, K. Zhou, et al., A Superlattice of Alternately Stacked Ni—Fe Hydroxide Nanosheets and Graphene for Efficient Splitting of Water, ACS Nano. 9 (2015) 1977-1984. doi:10.1021/nn5069836 each incorporated herein by reference in its entirety].

b. FT-IR Spectroscopy

Figure 2:
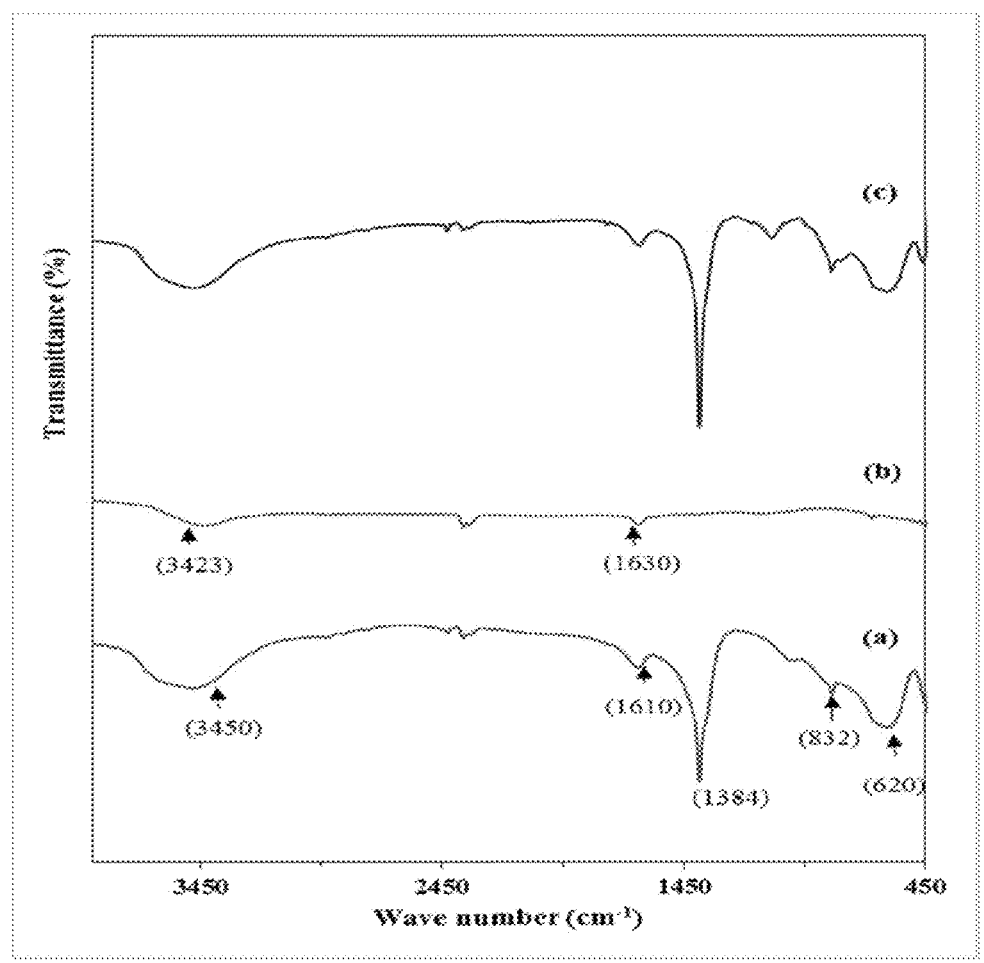
FIG. 2. shows FT-IR spectra of (a) MgAl LDHs; (b) PG and (c) 100LDHs.

The FT-IR spectra for pure LDHs, PG and 100LDH are presented in FIG. 2. The characteristic peaks for the LDHs have shown a broad band at 3470 cm$^{-1}$ which is due to the stretching vibration of hydrogen bonding and intercalated traces of water molecules that comes from synthesis process. Whereas, the weak band at peak position 1630 cm$^{-1}$ is representing the bending modes of these intercalated water molecules [S. Mallakpour, M. Dinari, Hybrids of Mg—Al-layered double hydroxide and multiwalled carbon nanotube as a reinforcing filler in the 1-phenylalanine-based polymer nanocomposites, J. Therm. Anal. Calorim. 119 (2015) 1905-1912. doi:10.1007/s10973-014-4270-9 incorporated herein by reference in its entirety]. Furthermore, the stretching vibration of the interlayer anions (NO$^{3-}$) of MgAl LDHs (1384 cm$^{-1}$) and metal-oxygen metal (400-810 cm$^{-1}$) are consistent with the reported data [S. Tang, H. K. Lee, Application of Dissolvable Layered Double Hydroxides As Sorbent in Dispersive Solid-Phase Extraction and Extraction by Co-Precipitation for the Determination of Aromatic Acid Anions, Anal. Chem. 85 (2013) 7426-7433. doi:10.1021/ac4013573 incorporated herein by reference in its entirety]. The PG absorption spectrum shows two weak band regions i.e. at position ≈1608 cm$^{-1}$ (due to skeleton vibration of the graphene nanosheets) and ≈3423 cm$^{-1}$ (due to structural —OH groups and vibration of water molecules) [S. Roy, S. K. Srivastava, J. Pionteck, V. Mittal, Mechanically and Thermally Enhanced Multiwalled Carbon Nanotube-Graphene Hybrid filled Thermoplastic Polyurethane Nanocomposites, Macromol. Mater. Eng. 300 (2015) 346-357. doi: 10.1002/mame.201400291 incorporated herein by reference in its entirety].

c. FE-SEM Micrographs

Figure 3A:
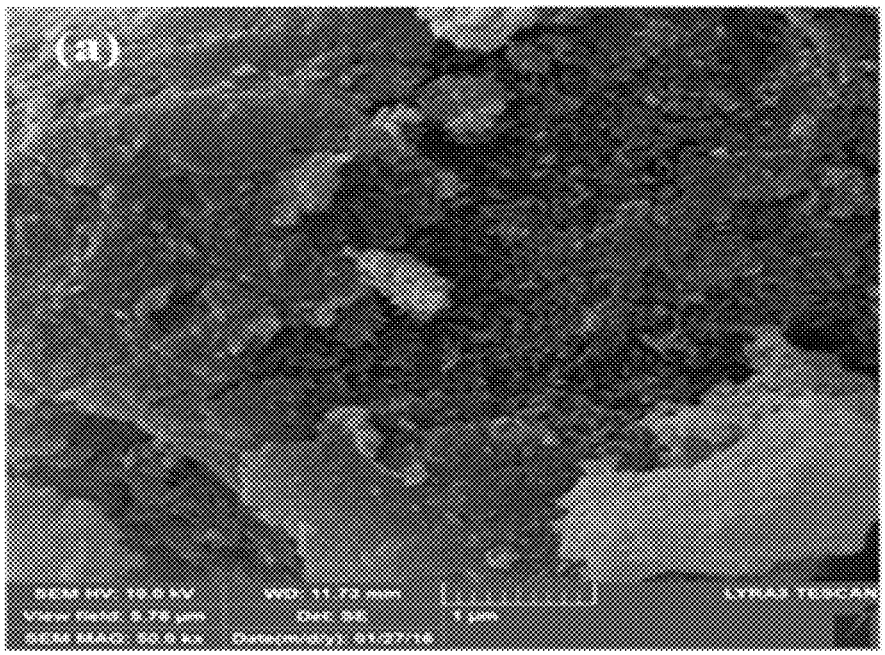
FIGS. 3A-3C are FE-SEM images of MgAl LDHs (FIG. 3A), PG (FIG. 3B), and 100LDHs (FIG. 3C)
Figure 3B:
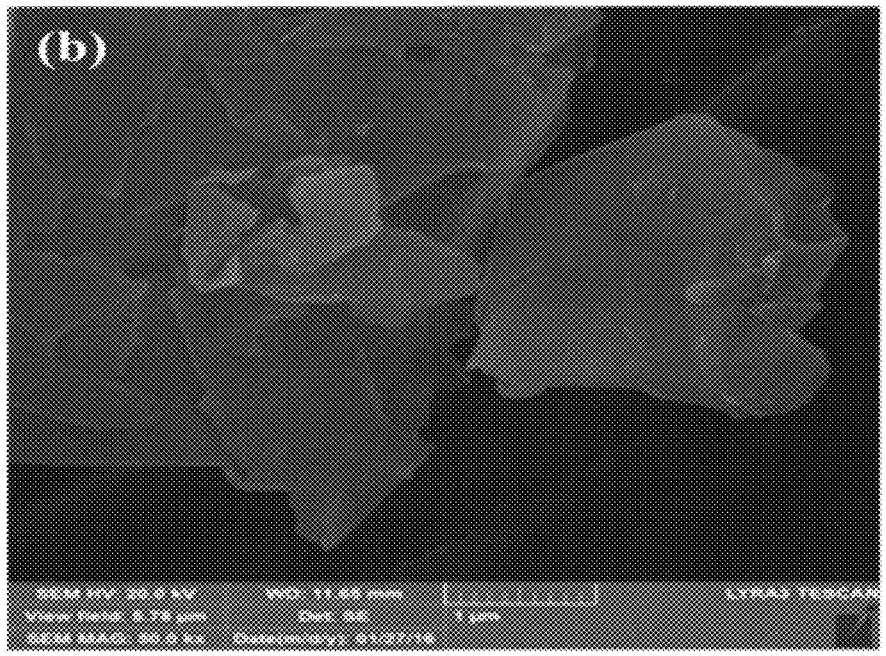
Figure 3C:
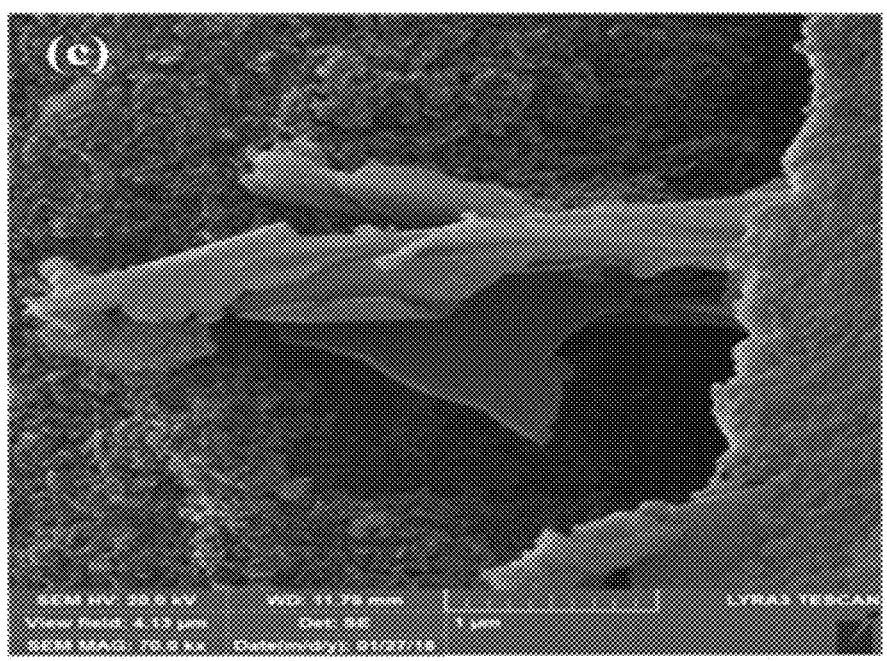

In order to study the morphology and microstructure of the hybrid NFs, PG (FIG. 3B), pure LDHs (FIG. 3A) and 100LDs (FIG. 3C) were characterized using FE-SEM. The PG is found to exist as smooth flat nanosheets, whereas, the occurrence of LDHs are as aggregates. The FE-SEM images for pure LDHs have revealed their lamellar surface morphology, stacked on top of each other. The hybrid micrograph (G/LDHs) has clearly shown the bounding of graphene nanosheets inside the lamellar structure of LDHs.

d. TEM Micrographs

Figure 4A:
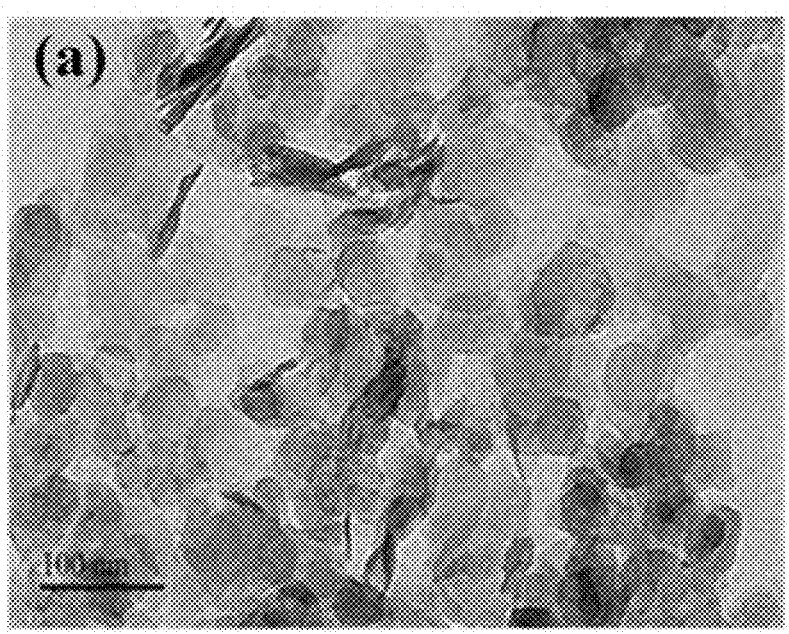
FIG. 4A-4C are HR-TEM images of MgAl LDHs (FIG. 4A), PG (FIG. 4B), and 100LDHs (FIG. 4C)
Figure 4B:
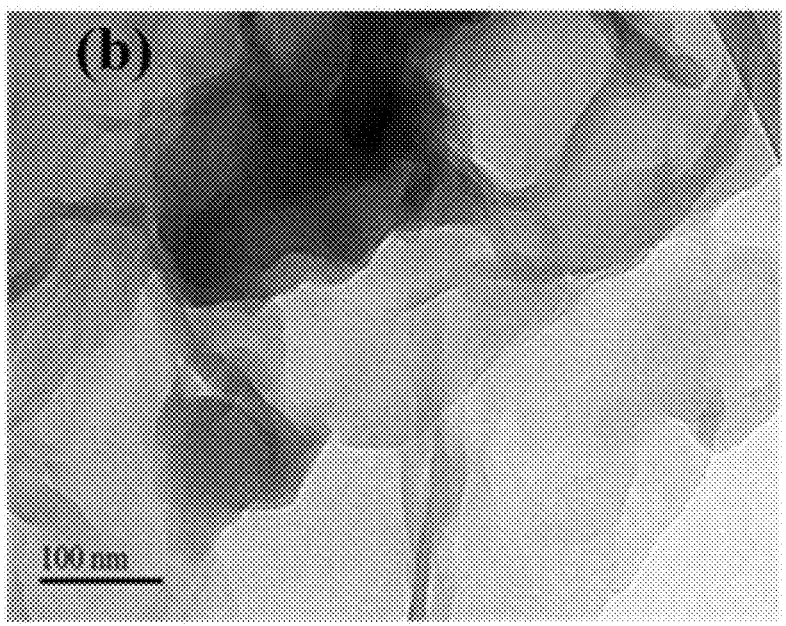
Figure 4C:
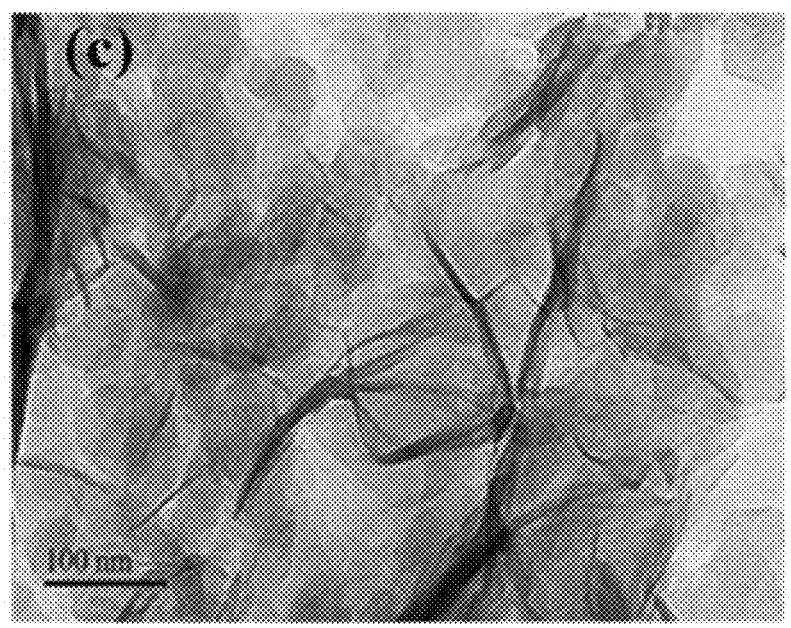

TEM images of PG, pure LDHs and 100LDHs are displayed in FIGS. 4A-4C. The customary hexagonal nanoscale platelet structure of LDHs can be clearly seen from HR-TEM micrographs (FIG. 4A). Moreover, these hexagons are stacked and strongly adhere to each other [S. Roy, S. K. Srivastava, J. Pionteck, V. Mittal, Assembly of layered double hydroxide on multi-walled carbon nanotubes as reinforcing hybrid nanofiller in thermoplastic polyurethane/nitrile butadiene rubber blends, Polym. Int. 65 (2016) 93-101. doi:10.1002/pi.5032 incorporated herein by reference in its entirety]. The hybrid G/LDHs micrograph has depicted homogeneous dispersion of nano-hexagons under the umbrella of graphene sheets (FIG. 4C).

Catalytic Activity and Microstructure Analysis of Polymers

Figure 5:
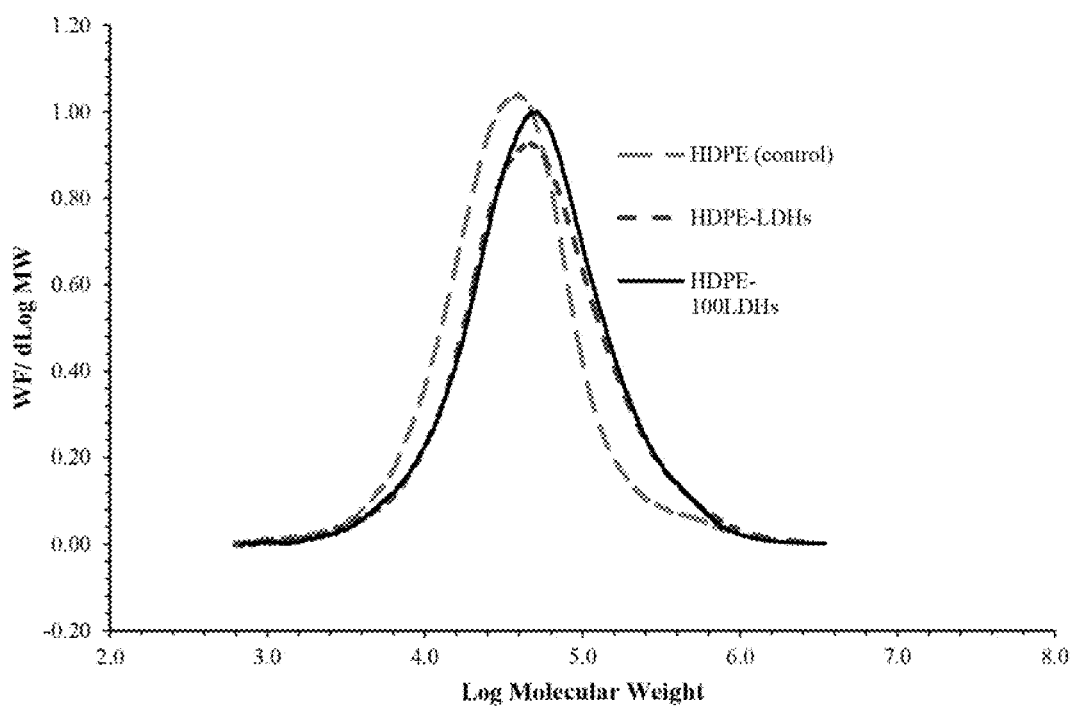
FIG. 5. shows a graph of molecular weight distribution for HDPE/nanocomposites.
Figure 6:
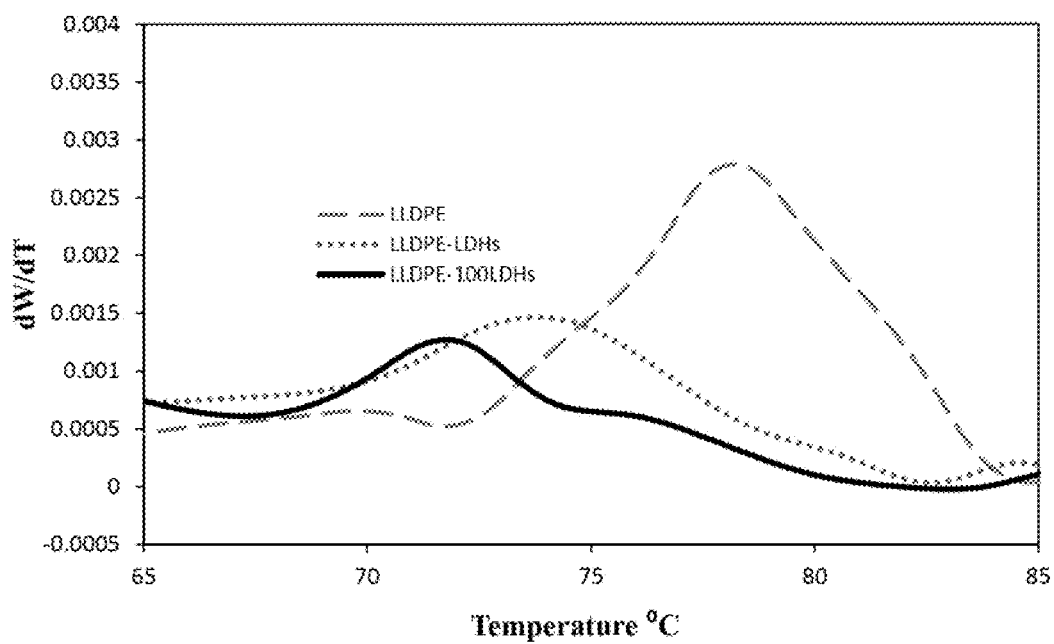
FIG. 6. shows a graph of CRYSTAF profiles of LLDPE/nanocomposites.

The addition of the hybrid NFs significantly increased the catalytic activities of both homo and copolymers (See Table 1). Higher catalytic activity was observed for the homopolymer study in the presence of NFs. However, the maximum catalytic activity was recorded with the hybrid nanofiller. A similar trend in the activity was observed for the copolymer as well with the filler addition. This increase in catalytic activity was attributed due to the easier access of monomers towards active sites of the catalyst. However, the increment increase in catalytic activity associated with G/LDHs was mainly because of the high surface area of these nano hybrids, which provides more space for the monomers to attack the catalyst. Moreover, the LDHs supported metallocene catalysts has also shown more stability to the catalyst towards ethylene polymerization [J.-C. Buffet, C. F. H. Byles, R. Felton, C. Chen, D. O'Hare, Metallocene supported core@LDH catalysts for slurry phase ethylene polymerisation, Chem. Commun. 52 (2016) 4076-4079. doi:10.1039/C6CC00280C]. The weight-average molecular weight ($M_w$) of the homopolymer was found to be increased due to the filler addition. This increase in M, is attributed due to steric and electron donating effect of NFs [F. Shehzad, M. Daud, M. A. Al-Harthi, Synthesis, characterization and crystallization kinetics of nanocomposites prepared by in situ polymerization of ethylene and graphene, J. Therm. Anal. Calorim. 123 (2016) 1501-1511. doi:10.1007/s10973-015-5087-x —incorporated herein by reference in its entirety]. Moreover, this steric effect of the NFs can be utilized in tuning the Mw of HDPE. In addition the MWD of the homopolymer was also found to be enhanced in the presence of NFs (See FIG. 5). It was also found that the peak slightly shifted to higher molecular weight upon addition of NFs. Contrary, minimal effects of NFs were recorded for molecular weights of the copolymers due to the presence of high short chain branching (SCB). CRYSTAF was utilized for the microstructure study of the LLDPE/nanocomposites, shown in FIG. 6. As expected, much wider profiles were obtained for the nanocomposites compared to the LLDPE (control), showing microstructure of the polymer is being altered. This change occurred in microstructure of the polymer samples were due to SCB (1-hexene incorporation), that were being induced by the NFs. The peak crystallization temperature ($T_{peak}$) obtained from CRYSTAF results are tabulated in Table 1. The decrease in $T_{peak}$ was observed, which shows that nanofiller are inducing more SCB to the polymer backbone thus decreasing the $M_w$. The CRYSTAF results were further validated by $^{13}C$ NMR analysis (See Table 1).

TABLE 1

Effect of hybrid G/LDHs NFs on the catalytic activity and molecular weights of homopolymer and copolymer

| S/no | Sample code | Filler type/ Amount (mg) | $S_{BET}^a$ (g/m$^2$) | Activity$^b$ (kg PE mole$^{-1}$ hr$^{-1}$ bar$^{-1}$) | Mw$^c$ (g/mol) | $T_{peak}^d$ | Mol % of 1-hexene$^e$ | PDI |
|---|---|---|---|---|---|---|---|---|
| 1. | HDPE (control) | No filler | — | 157 | 65,828 | — | — | 3.1 |
| 2. | HDPE-LDHs | Pure LDHs/75 | 47.2 | 200 | 93,870 | — | — | 3.0 |
| 3. | HDPE-100LDHs | 100LDHs/75 | 62.8 | 232 | 94,256 | — | — | 3.4 |
| 4. | LLDPE (control) | No filler | — | 246 | 22,141 | 78.2 | 3.3 | 2.8 |
| 5. | LLDPE-LDHs | Pure LDHs/75 | 47.2 | 300 | 19,266 | 73.4 | 5.1 | 2.9 |
| 6. | LLDPE-100LDHs | 100LDHs/75 | 62.8 | 390 | 20,944 | 71.1 | 5.8 | 2.1 |

Reaction Temperature = 30° C.; solvent used = toluene (100 mL); zirconocene amount = 6 mg (20 μmol); co-monomer used = 1-hexene (1 mL); polymerization time = 30 min
$^a$surface area calculated from the BET analysis using liquid nitrogen
$^b$determined yield analysis (average of three samples)
$^c$determined by GPC
$^d$determined by CRYSTAF
$^e$determined by $^{13}C$ NMR Hybrid G/LDHs NFs were used for the synthesis of LLDPE/nanocomposites. High catalytic activities were recorded for the homo and copolymer nanocomposites due to the NFs addition. For the homopolymer, a maximum catalytic activity was recorded for HDPE-100LDHs (Approx. 47.6% increased). The increase in catalytic activity for LLDPE-100LDHs was approximately 58.5% compared to LLDPE (control). Further, the NFs increased the M, for homopolymer. The 1-hexene incorporation was found to be increased in the presence of G/LDHs due to higher SCB.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A copolymerization process for producing a polyethylene copolymer nanocomposite, comprising:
    forming a polymerization mixture comprising a graphene-layered double hydroxide nanocomposite, a metallocene catalyst, an alkylaluminoxane co-catalyst, a comonomer selected from the group consisting of 1-butene, 1-hexene, and 1-octene, and an organic solvent;
    adding ethylene into the polymerization mixture;
    polymerizing the ethylene in the polymerization mixture to form the polyethylene copolymer nanocomposite;
    wherein the polyethylene copolymer nanocomposite comprises the graphene-layered double hydroxide nanocomposite dispersed in a matrix of the polyethylene copolymer;
    wherein the graphene-layered double hydroxide nanocomposite comprises a layered double hydroxide and 1 to 7 wt. % graphene relative to a total weight of the graphene-layered double hydroxide nanocomposite; and
    wherein the layered double hydroxide has a lamellar morphology of adhered hexagonal nanoplatelets having a particle size of 40 to 100 nm.

2. The method of claim 1, wherein the layered double hydroxide is a Mg(II)/Al(III) layered double hydroxide.

3. A copolymerization process for producing a polyethylene copolymer nanocomposite, comprising:
    forming a polymerization mixture comprising a graphene-layered double hydroxide nanocomposite, a metallocene catalyst, an alkylaluminoxane co-catalyst, a comonomer selected from the group consisting of 1-butene, 1-hexene, and 1-octene, and an organic solvent;
    adding ethylene into the polymerization mixture;
    polymerizing the ethylene in the polymerization mixture to form the polyethylene copolymer nanocomposite;
    wherein the polyethylene copolymer nanocomposite comprises the graphene-layered double hydroxide nanocomposite dispersed in a matrix of the polyethylene copolymer;
    wherein the graphene-layered double hydroxide nanocomposite comprises a layered double hydroxide and 1 to 7 wt. % graphene relative to a total weight of the graphene-layered double hydroxide nanocomposite,
    wherein the layered double hydroxide is a Mg(II)/Al(III) layered double hydroxide, and
    wherein the Mg(II)/Al(III) layered double hydroxide has a molar ratio of Mg(II) to Al(III) of 2:1 to 4:1.

4. The method of claim 1, wherein the graphene of the graphene-layered double hydroxide nanocomposite is in the form of nanosheets having a largest dimension of 50 to 100 nm.

5. The method of claim 1, wherein the graphene of the graphene-layered double hydroxide nanocomposite is dispersed in, and bound to, the layered double hydroxide.

6. The method of claim 1, wherein the graphene-layered double hydroxide nanocomposite has a BET surface area of 50 to 75 g/m$^2$.

7. The method of claim 1, wherein the metallocene catalyst is zirconocene dichloride.

8. The method of claim 1, wherein the alkylaluminoxane co-catalyst is methylaluminoxane.

9. The method of claim 1, wherein the organic solvent is an aromatic hydrocarbon.

10. A copolymerization method for producing a polyethylene copolymer nanocomposite, comprising:
    forming a polymerization mixture comprising a graphene-layered double hydroxide nanocomposite, a metallocene catalyst, an alkylaluminoxane co-catalyst, a comonomer selected from the group consisting of 1-butene, 1-hexene, and 1-octene, and an organic solvent;
    adding ethylene into the polymerization mixture;
    polymerizing the ethylene in the polymerization mixture to form the polyethylene copolymer nanocomposite;
    wherein the polyethylene copolymer nanocomposite comprises the graphene-layered double hydroxide nanocomposite dispersed in a matrix of the polyethylene copolymer;
    wherein the graphene-layered double hydroxide nanocomposite comprises a layered double hydroxide and 1 to 7 wt. % graphene relative to a total weight of the graphene-layered double hydroxide nanocomposite, and
    wherein a weight ratio of the alkylaluminoxane co-catalyst to the metallocene catalyst is 30:1 to 70:1.

11. The method of claim 1, wherein a weight ratio of the graphene-layered double hydroxide nanocomposite to the metallocene catalyst is from 10:1 to 13:1.

12. The method of claim 1, wherein the polyethylene copolymer nanocomposite comprises 0.05 to 3 wt. % of the graphene-layered double hydroxide nanocomposite relative to a total weight of the polyethylene copolymer nanocomposite.

13. The method of claim 1, wherein the polyethylene copolymer nanocomposite is a high density polyethylene copolymer nanocomposite comprising the graphene-layered double hydroxide nanocomposite dispersed in a matrix of high density polyethylene copolymer.

14. The method of claim 13, wherein the high density polyethylene copolymer has a weight average molecular weight of 94,000 to 100,000 g/mol and a polydispersity index of 3.2 to 3.5.

15. The method of claim 13, wherein 210 to 250 kg of high density polyethylene copolymer is produced per mole of the metallocene catalyst per hour per bar (kgPE·mol$^{-1}$·hr$^{-1}$·bar$^{-1}$).

16. The method of claim 1, wherein the polyethylene copolymer nanocomposite is a linear low density polyethylene copolymer nanocomposite comprising the graphene-layered double hydroxide nanocomposite dispersed in a matrix of linear low density polyethylene copolymer.

17. The method of claim 16, wherein the linear low density polyethylene copolymer is a copolymer of ethylene and the at least one comonomer, and wherein a % incorporation of the at least one co-monomer into the linear low density polyethylene copolymer is 5.2 to 10 mol %, based on a total number of moles of ethylene and the at least one co-monomer incorporated into the linear low density polyethylene copolymer.

18. The method of claim 16, wherein the linear low density polyethylene copolymer has a weight average molecular weight of 15,000 to 25,000 g/mol and a polydispersity index of 1.5 to 2.7, and wherein the linear low density polyethylene copolymer nanocomposite has a peak crystallization temperature ($T_{peak}$) of 65 to 73° C.

19. The method of claim 16, wherein 320 to 450 kg of linear low density polyethylene copolymer is produced per mole of the metallocene catalyst per hour per bar (kgPE·mol$^{-1}$·h$^{-1}$·bar$^{-1}$).

\* \* \* \* \*